US012699214B2

(12) United States Patent　　(10) Patent No.:　US 12,699,214 B2
Padiyath et al.　　(45) Date of Patent:　Aug. 4, 2026

(54) MULTILAYER OPTICAL FILM AND GLASS LAMINATE INCLUDING SAME

(71) Applicant: 3M INNOVATIVE PROPERTIES COMPANY, St. Paul, MN (US)

(72) Inventors: Raghunath Padiyath, Woodbury, MN (US); Lin Zhao, Woodbury, MN (US); Gilles J. Benoit, Minneapolis, MN (US); Matthew B. Johnson, Woodbury, MN (US); Edward J. Kivel, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 270 days.

(21) Appl. No.: 18/552,218

(22) PCT Filed: Mar. 3, 2022

(86) PCT No.: PCT/IB2022/051888
§ 371 (c)(1),
(2) Date: Sep. 25, 2023

(87) PCT Pub. No.: WO2022/219422
PCT Pub. Date: Oct. 20, 2022

(65) Prior Publication Data
US 2024/0184027 A1　Jun. 6, 2024

Related U.S. Application Data

(60) Provisional application No. 63/175,299, filed on Apr. 15, 2021.

(51) Int. Cl.
*G02B 5/28* (2006.01)
*G02B 1/111* (2015.01)

(52) U.S. Cl.
CPC .............. *G02B 5/282* (2013.01); *G02B 1/111* (2013.01)

(58) Field of Classification Search
None
See application file for complete search history.

(56) References Cited

U.S. PATENT DOCUMENTS 5,103,337 A　4/1992　Schrenk et al.
5,540,978 A　7/1996　Schrenk
(Continued)

FOREIGN PATENT DOCUMENTS

WO　2015056752 A1　4/2015

OTHER PUBLICATIONS

International Search Report received for PCT International Application No. PCT/IB2022/051888, mailed on May 24, 2022, 3 pages.

*Primary Examiner* — Carl Adams
(74) *Attorney, Agent, or Firm* — Clifton F. Richardson; Theresa R. Stadheim

(57) ABSTRACT

A multilayer optical film includes a plurality of alternating polymeric first and second layers and optically absorptive material dispersed in at least one layer of the multilayer optical film. The multilayer optical film has an average optical transmittance in a visible wavelength range extending from about 450 nm to about 650 nm of about 0.5% to about 40%, an average optical reflectance in the visible wavelength range of less than about 40%, and an average optical reflectance in an infrared wavelength range extending from about 850 nm to about 1200 nm of greater than about 60%. For illuminant D65 light incident on the multilayer optical film, the multilayer optical film reflects and transmits portions of the incident light as reflected and transmitted lights that have color shifts below specified limits in a CIE L*a*b* color space. A glass laminate (Continued)

includes the multilayer optical film disposed between glass
layers.

20 Claims, 25 Drawing Sheets

(56)                    References Cited

U.S. PATENT DOCUMENTS

| | | | |
|---|---|---|---|
| 5,882,774 | A | 3/1999 | Jonza et al. |
| 6,045,894 | A | 4/2000 | Jonza et al. |
| 6,179,948 | B1 | 1/2001 | Merrill et al. |
| 6,207,260 | B1 | 3/2001 | Wheatley et al. |
| 6,531,230 | B1 | 3/2003 | Weber et al. |
| 6,783,349 | B2 | 8/2004 | Neavin et al. |
| 6,967,778 | B1 | 11/2005 | Wheatley et al. |
| 9,162,406 | B2 | 10/2015 | Neavin et al. |
| 2016/0109628 | A1* | 4/2016 | Weber .................. G02B 5/0816 |
| | | | 359/359 |
| 2020/0192002 | A1 | 6/2020 | Bellman et al. |
| 2024/0184027 | A1* | 6/2024 | Padiyath ................ G02B 5/282 |

* cited by examiner

Reflectance or Transmittance (%)

Wavelength (nm)

MULTILAYER OPTICAL FILM AND GLASS LAMINATE INCLUDING SAME

CROSS REFERENCE TO RELATED APPLICATIONS

This application is a national stage filing under 35 U.S.C. 371 of PCT/IB2022/051888, filed Mar. 3, 2022, which claims the benefit of U.S. Application No. 63/175,299, filed Apr. 15, 2021, the disclosures of which are incorporated by reference in their entireties herein.

BACKGROUND

An infrared reflecting film can be used for reducing solar heat gain into a space. For example, an infrared reflecting optical film can be used as a window film for reducing solar heating of a room in a building or can be used in laminated windshields or sunroofs to reduce solar heating of an interior of an automobile.

SUMMARY

The present description generally relates to multilayer optical films having a color shift (e.g., along at least one axis in a color space) of reflected and/or transmitted light below a specified limit. The multilayer optical film can have an average optical reflectance in an infrared wavelength range extending from about 850 nm to about 1200 nm of greater than about 60%. The multilayer optical film can have an average optical transmittance in a visible wavelength range extending from about 450 nm to about 650 nm of less than about 50%

In some aspects of the present description, a multilayer optical film is provided. The multilayer optical film includes a plurality of alternating polymeric first and second layers numbering at least 20 in total where each of the first and second layers has an average thickness of less than about 500 nm, and optically absorptive material dispersed in at least one layer of the multilayer optical film. For a substantially normally incident light and for each of two mutually orthogonal polarization states, the multilayer optical film can have an average optical transmittance in a visible wavelength range extending from about 450 nm to about 650 nm of about 0.5% to about 40%, an average optical reflectance in the visible wavelength range of less than about 40%, and an average optical reflectance in an infrared wavelength range extending from about 850 nm to about 1200 nm of greater than about 60%. In some embodiments, for a light incident on the multilayer optical film from an illuminant D65, the multilayer optical film reflects and transmits portions of the incident light as reflected and transmitted lights having, in a CIE L*a*b* color space, respective "a*" colorimetric parameters ar1* and at1* for an incident angle of less than about 10 degrees and respective "a*" colorimetric parameters ar2* and at2* for an incident angle of about 40 degrees, a magnitude of a difference between each of at1* and at2*, and ar1* and ar2* being less than about 20. In some embodiments, for a light incident on the multilayer optical film from an illuminant D65, the multilayer optical film reflects and transmits portions of the incident light as reflected and transmitted lights having, in a CIE L*a*b* color space, respective "b*" colorimetric parameters br1* and bt1* for an incident angle of less than about 10 degrees and respective "b*" colorimetric parameters br2* and bt2* for an incident angle of about 60 degrees, where a magnitude of a difference between each of br1* and br2*, and bt1* and bt2* is less than about 35. In some embodiments, for a light incident on the multilayer optical film from an illuminant D65 at an incident angle, the multilayer optical film transmits a portion of the incident light as a transmitted light having, in a CIE L*a*b* color space, an "a*" colorimetric parameter at* and a "b*" colorimetric parameter bt*, where a magnitude of each of at* and bt* remains less than about 35 as the incident angle varies continuously from less than about 10 degrees to at least about 40 degrees. In some embodiments, for a light incident on the multilayer optical film from an illuminant D65 at an incident angle, the multilayer optical film reflects a portion of the incident light as a reflected light having, in CIE L*a*b* color space, an "a*" colorimetric parameter ar* and a "b*" colorimetric parameter br*, where a magnitude of each of ar* and br* remains less than about 45 as the incident angle varies continuously from less than about 10 degrees to at least about 40 degrees.

These and other aspects will be apparent from the following detailed description. In no event, however, should this brief summary be construed to limit the claimable subject matter.

BRIEF DESCRIPTION OF THE DRAWINGS

FIGS. 12A-12B are plots of calculated transmittance and reflectance for a glass laminate including a multilayer optical film including skin layers loaded with the blue, red, yellow, and cyan dyes of FIG. 11, according to some embodiments.

DETAILED DESCRIPTION

Figure 1A:
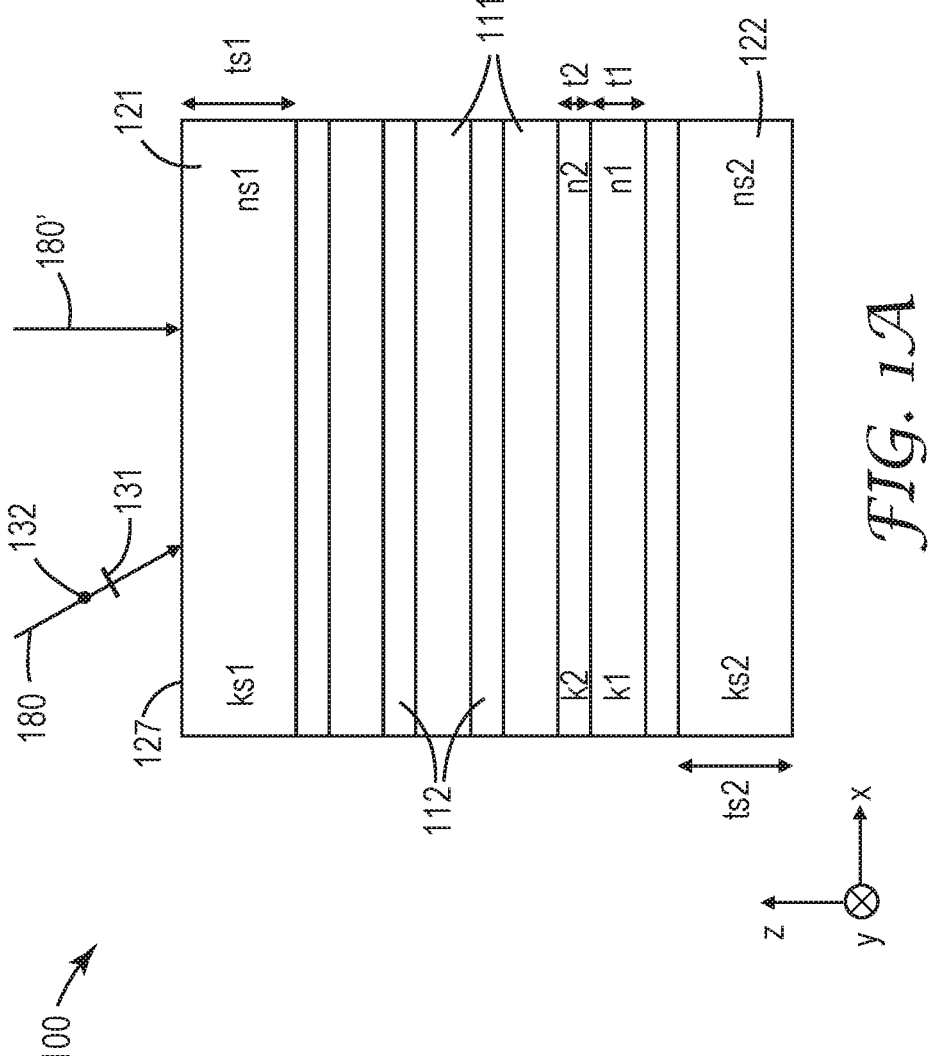
FIG. 1A is a schematic cross-sectional view of a multilayer optical film, according to some embodiments.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Multilayer optical films including alternating polymeric layers can be used to provide desired reflection and transmission in desired wavelength ranges by suitable selection of layer thicknesses and refractive index differences as generally described in U.S. Pat. No. 5,882,774 (Jonza et al.); U.S. Pat. No. 6,179,948 (Merrill et al.); U.S. Pat. No. 6,783,349 (Neavin et al.); U.S. Pat. No. 6,967,778 (Wheatley et al.); and U.S. Pat. No. 9,162,406 (Neavin et al.), for example. The alternating polymeric layers typically include alternating high and low index layers which can be described as optical layers that transmit and reflect light primarily by optical interference. A multilayer optical film including alternating high and low index layers can be described as including a plurality of optical repeat units where each optical repeat unit includes a high index layer and a low index layer. Each optical repeat unit may include one or more layers in addition to the high and low index layers as described in U.S. Pat. No. 5,103,337 (Schrenk et al.); U.S. Pat. No. 5,540,978 (Schrenk) and U.S. Pat. No. 6,207,260 (Wheatley et al.), for example.

A multilayer optical film can have an infrared reflection band for reducing solar heat gain into a space. For example, an infrared reflecting optical film can be used as a window film for reducing solar heating of a room in a building. As another example, an infrared reflecting optical film can be used in laminated windshields or sunroofs to reduce solar heating of an interior of an automobile. Conventional infrared reflecting optical films can have an undesired color shift with incident angle for reflected light and/or for transmitted light due to, for example, the infrared reflection band shifting into the visible range and/or a harmonic of the infrared reflection band shifting into, out of, or within the visible range. According to some aspects of the present description, it has been found that optically absorptive material can be included in various layer(s) of the optical film to substantially reduce a color shift with incident angle for light reflected from and transmitted through the optical film. In some embodiments, the optical film has a near infrared reflection band (e.g., in a wavelength range extending at least from about 850 nm to about 1200 nm) and at least one harmonic of the infrared reflection band is at least partially disposed in a visible wavelength range of about 420 nm to about 680 nm, or about 450 nm to about 650 nm, for at least one angle of incidence. In some such embodiments, a first portion of the optically absorptive material is selected to reduce reflection from the harmonic in the visible range and result in a low color shift in reflection and a second portion of the optically absorptive material is selected to result in a low color shift in transmission. For example, in some embodiments, the first portion may be disposed in an outer layer or outer layers of the optical film adapted to face the light source (e.g., a top layer of the optical film in a sunroof) and the second portion may be disposed in an outer layer or outer layers of the optical film adapted to face away from the light source (e.g., a bottom layer of the optical film in a sunroof). Alternatively, or in addition, at least portions of the first and/or second portions of the optically absorptive material may be dispersed in optical layers of the optical film. For example, in some embodiments, a first portion of the optically absorptive material may be dispersed in the skin layers and a second portion of the optically absorptive material may be dispersed in the first layers of alternating first and second layers of the optical film where the first layers have a higher refractive index than the second layers.

The optically absorptive material can be selected to result in a desired visible light transmittance while providing a low color shift with incident angle. The desired visible light transmittance can depend on the application. For example, in some sunroof applications, an average visible light transmission in a range of about 0.5% to about 20% may be desired. The color of the reflected and/or transmitted light may be neutral (e.g., low a*, b* colorimetric parameters) or may be have a predetermined color (e.g., a*, b* colorimetric parameters in specified ranges) depending on the optically absorptive material chosen.

A multilayer optical film may include optical repeat units including at least first and second layers. The optical film may be characterized by the f-ratios of the layers of the optical repeat units. The f-ratio of a layer of an optical repeat unit is the optical thickness of the layer divided by the optical thickness of the optical repeat unit, where the optical thickness of each layer of the optical repeat unit is the thickness of the layer multiplied by an index of refraction of the layer along a same in-plane direction and the optical thickness of the optical repeat unit is the sum of the optical thickness for each of the layers. The refractive indices may be determined at a wavelength in a specified visible wavelength range (e.g., from about 420 nm to about 680 nm or about 450 nm to about 650 nm). The refractive indices may be determined at a wavelength of about 532 nm, or about 550 nm, or about 589 nm, or about 633 nm, for example. The f-ratio of the optical film (when the layer of an optical repeat unit is not specified) generally refers to the f-ratio of the layer of the optical repeat unit having the highest index of refraction. In some embodiments, the optical film has an f-ratio of about 0.5. This can result in a suppressed second order harmonic of the infrared reflection band, but the third order harmonic can be present. In other embodiments, a different f-ratio (e.g., from about 0.55 to about 0.8 or from about 0.2 to about 0.45) is used. It has been found that shifting the f-ratio from 0.5 allows the strength of the second and third order harmonics of the infrared reflection band to be tuned to further reduce color shift of reflected and/or transmitted light with incident angle. For example, the f-ratio may be selected to provide a substantially constant reflectance as a function of wavelength throughout a visible wavelength range.

Figure 1B:
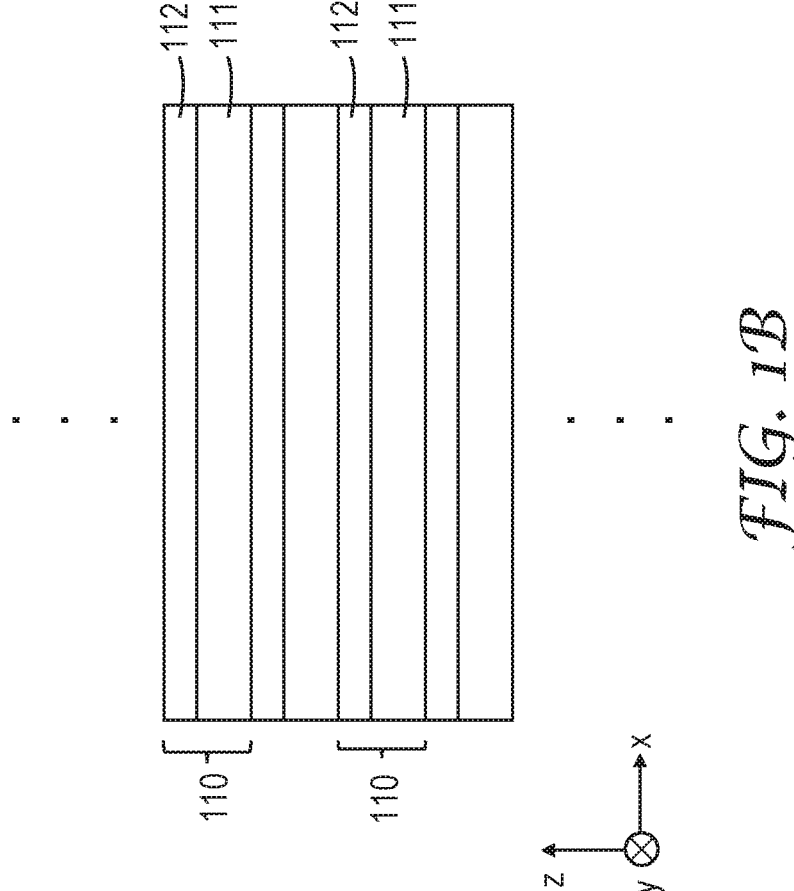
FIG. 1B is a schematic cross-sectional view of a portion of a multilayer optical film, according to some embodiments.

FIG. 1A is a schematic cross-sectional view of a multi-layer optical film 100, according to some embodiments. The optical film 100 includes a plurality of alternating polymeric first and second layers 111 and 112. The optical film 100 may include many more layers than schematically illustrated in FIG. 1A. FIG. 1B is a schematic cross-sectional view of a portion of a multilayer optical film 100, according to some embodiments, indicating a larger number of alternating first and second layers 111 and 112. In some embodiments, the alternating first and second layers 111 and 112 number at least 20 in total, or at least 40 in total, or at least 60 in total, or at least 80 in total, or at least 100 in total. In some such embodiments, or in other embodiments, the alternating first and second layers 111 and 112 number no more than 1000 in total, or no more than 800 in total, or no more than 700 in total, or no more than 650 in total, or no more than 600 in total. In some embodiments, each of the first and second layers 111 and 112 has an average thickness t1, t2 of less than about 500 nm, or less than about 400 nm, or less than about 350 nm. In some such embodiments, or in other embodiments, each of the first and second layers 111 and 112 has an average thickness t1, t2 of greater than about 50 nm, or greater than about 70 nm, or greater than about 90 nm.

The multilayer optical film 100 may be described as including a plurality of optical repeat units 110 where each optical repeat unit 110 includes at least individual first and second layers 111 and 112. The plurality of optical repeat units 110 may number between about 10 and about 400 in total, or between about 10 and about 300 in total, or between about 10 and about 250 in total, or between about 50 and about 250 in total, for example. An optical repeat unit is generally the smallest distinct unit of optical layers that repeats along a thickness direction (z-direction) of the optical film. The total number of optical repeat units in the plurality of optical repeat units refers to the total number of distinct optical repeat units (no layer of the film is in more than one distinct optical repeat unit). In some embodiments, each optical repeat unit 110 unit may include one or more layers in addition to the first and second layers 111 and 112.

The optical film 100 may further include first and second skin layers 121 and 122 where the plurality of alternating polymeric first and second layers 111 and 112, and/or the plurality of optical repeat units 110, is disposed between the first and second skin layers 121 and 122. In some embodiments, each of the first and second skin layers 121 and 122 has an average thickness ts1, ts2 of greater than about 500 nm, or greater than about 750 nm, or greater than about 1000 nm (1 micrometer), or greater than about 1500 nm, or greater than about 2000 nm. The first and second skin layers 121 and 122 may be integrally formed with the plurality of alternating polymeric first and second layers 111 and 112 and/or with the plurality of optical repeat units 110.

As used herein, a first element "integrally formed" with a second element means that the first and second elements are manufactured together rather than manufactured separately and then subsequently joined. Integrally formed includes manufacturing a first element followed by manufacturing the second element on the first element. Skin layers and optical layers (e.g., the alternating polymeric first and second layers and/or the optical repeat units), for example, are integrally formed with one another if the layers are manufactured together (e.g., combined as melt streams and then cast onto a chill roll to form a cast film having each of the layers, and then orienting the cast film) rather than manufactured separately and then subsequently joined.

Suitable materials for the various layers in the multilayer optical film 100 include, for example, polyethylene naphthalate (PEN), coPEN (copolyethylene naphthalate terephthalate copolymer), polyethylene terephthalate (PET), poly-hexylethylene naphthalate copolymer (PHEN), glycol-modified PET (PETG), glycol-modified PEN (PENG), syndiotactic polystyrene (sPS), THV (a terpolymer of tetrafluoroethylene, hexafluoropropylene and vinylidene fluoride), polymethyl methacrylate (PMMA), coPMMA (a copolymer of methyl methacrylate and ethyl acrylate), or blends thereof.

The optical film 100 may include additional layers not shown in FIGS. 1A-1B. For example, protective boundary layers between packets of optical repeat units may be included as is known in the art. The optical film 100 may further include first and second adhesive layers where the first and second skin layers 121 and 122 and the plurality of alternating polymeric first and second layers 111 and 112 (and/or the plurality of optical repeat units 110) are disposed between the first and second adhesive layers.

Figure 2:
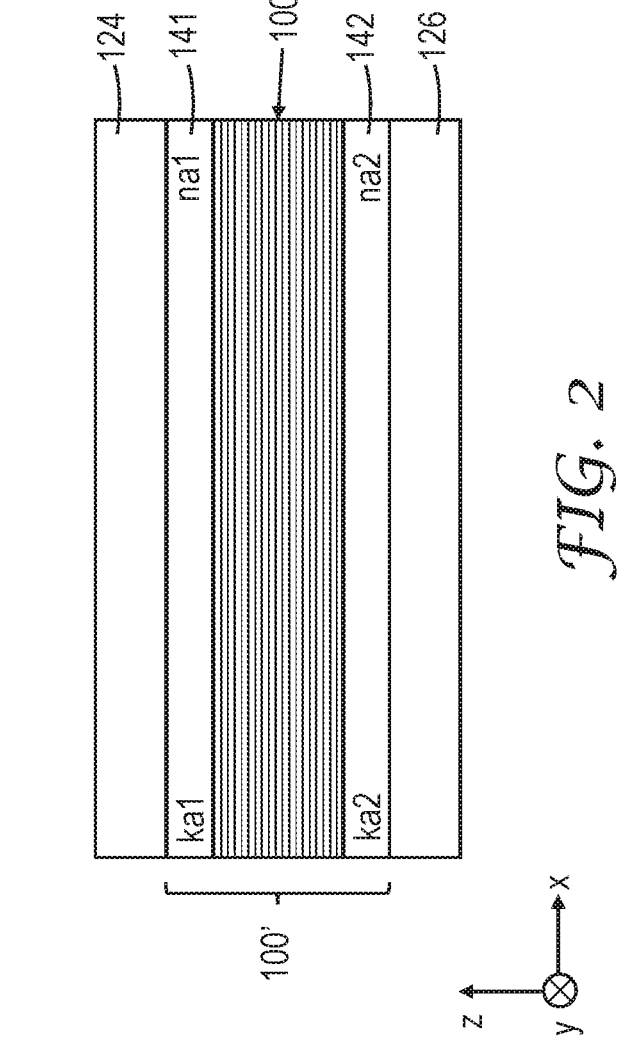
FIG. 2 is a schematic cross-sectional view of a glass laminate, according to some embodiments.

In some embodiments, the optical film 100 is used in a glass laminate, for example. FIG. 2 is a schematic cross-sectional view of a glass laminate 101 including first and second glass layers 124 and 126 and a multilayer optical film 100' disposed therebetween, according to some embodiments. In the illustrated embodiment, the optical film 100' includes first and second adhesive layers 141 and 142 and the multilayer optical film 100 disposed therebetween.

The first and second adhesive layers 141 and 142 may be, for example, any adhesive known to be suitable for bonding to glass. Suitable materials for the first and second adhesive layers 141 and 142 include, for example, one or more of pressure sensitive adhesives, liquid optically clear adhesives, radiation or thermally curable adhesives, or hot melt adhesives. In some embodiments, each of the adhesive layers 141 and 142 comprises polyvinyl butyral (PVB).

In some embodiments, the first and second layers 111 and 112 (e.g., in each of the optical repeat units 110) have respective indices of refraction n1 and n2 and corresponding respective f-ratios f1 and f2 along a same in-plane first direction (e.g., x-direction) for a same first visible wavelength in a visible wavelength range extending from about 420 nm to about 680 nm or from about 450 nm to about 650 nm. In some embodiments, n1>n2. In other embodiments, n2>n1. In some embodiments, each of f1 and f2 is about 0.5 (e.g., the thicker of the first and second layers may have a lower refractive index than the thinner of the first and second layers such that f1 is about 0.5). In some embodiments, n1>n2 and one of f1 and f2 is between about 0.55 and about 0.80 (e.g., in a range of 0.55 to 0.80) or between about 0.6 and about 0.75 (e.g., in a range of 0.6 to 0.75) or between about 0.625 and about 0.725 (e.g., in a range of 0.625 to 0.725). In some such embodiments, f1 is between about 0.55 and about 0.80 (e.g., in a range of 0.55 to 0.80) or between about 0.6 and about 0.75 (e.g., in a range of 0.6 to 0.75) or between about 0.625 and about 0.725 (e.g., in a range of 0.625 to 0.725). In some embodiments, the optical repeat units 110 include only two individual layers (e.g., first and second layers 111 and 112). In such embodiments, f1+f2=1. An f-ratio of the optical film may be defined as the f-ratio of the layer of the optical repeat unit having the highest refractive index (e.g., if the first layers have a higher refractive index along the in-plane first direction than the second layers, f1 may be referred to as the f-ratio of the optical film).

In some embodiments, the first and second skin layers 121 and 122 have respective indices of refraction ns1 and ns2 along a same in-plane first direction (e.g., x-direction) for a same first visible wavelength in a visible wavelength range extending from about 420 nm to about 680 nm or from about 450 nm to about 650 nm. In some embodiments, ns1 and ns2 are about equal to one another and, in some embodiments, each of ns1 and ns2 is about equal to one of n1 and n2 (e.g., each of the skin layers 121 and 122 can be formed of a same material as that of one of the first and second layers 111 and 112). In some embodiments, the first and second adhesive layers 141 and 142 have respective indices of refraction na1 and na2 along a same in-plane first direction (e.g., x-direction) for a same first visible wavelength in a visible wavelength range extending from about 420 nm to about 680 nm or from about 450 nm to about 650 nm. In some embodiments, na1 and na2 are each in a range of about 1.4 to about 1.6, or about 1.45 to about 1.55, for example.

In general, a layer can be described as having a complex refractive index N having a real part n and an imaginary part k. The real part n of the complex refractive index N is referred to as the refractive index or index of refraction (if refractive index is referred to without specifying that it is a complex refractive index, it should be understood that the real part is being referred to) and the imaginary part k is referred to as the extinction coefficient. The complex refractive index (and its real and imaginary parts) can be defined along different directions (e.g., the complex refractive index can be different for light polarized along different directions). In some embodiments, the first and second layers 111 and 112 (e.g., in each of the optical repeat units 110) have respective extinction coefficients k1 and k2 along a same in-plane first direction (e.g., x-direction) for a same first visible wavelength in a visible wavelength range extending from about 420 nm to about 680 nm or from about 450 nm to about 650 nm. In some embodiments, the first and second skin layers 121 and 122 have respective extinction coefficients ks1 and ks2 along a same in-plane first direction (e.g., x-direction) for a same first visible wavelength in a visible wavelength range extending from about 420 nm to about 680 nm or from about 450 nm to about 650 nm. In some embodiments, the first and second adhesive layers 141 and 142 have respective extinction coefficients ka1 and ka2 along a same in-plane first direction (e.g., x-direction) for a same first visible wavelength in a visible wavelength range extending from about 420 nm to about 680 nm or from about 450 nm to about 650 nm.

In some embodiments, at least one of the first and second layers 111 and 112 and/or at least one of the first and second skin layers 121 and 122 and/or at least one of the first and second adhesive layers 141 and 142 includes optically absorptive material (e.g., dye(s), pigment(s), or a combination thereof). A layer not including optically absorptive material may have an extinction coefficient k (e.g., corresponding to one or more of k1, k2, ks1, ks2, ka1, ka2) of less than about $10^{-5}$, or less than about $7 \times 10^{-6}$, or less than about $5 \times 10^{-6}$, or less than about $2 \times 10^{-6}$ along each in-plane direction and for each wavelength in a visible wavelength range from about 420 nm to about 680 nm or about 450 nm to about 650 nm. A layer including optically absorptive material may have an extinction coefficient k (e.g., corresponding to one or more of k1, k2, ks1, ks2, ka1, ka2) of greater than about $2 \times 10^{-5}$, or greater than about $5 \times 10^{-5}$, or greater than about $10^{-4}$, or greater than about $5 \times 10^{-4}$, or greater than about $10^{-3}$, along at least one in-plane direction and for at least one wavelength in a visible wavelength range from about 420 nm to about 680 nm or form about 450 nm to about 650 nm. In some embodiments, optically absorptive material is dispersed in at least one layer of the multilayer optical film, where the at least one layer includes one or more layers having an extinction coefficient of greater than about $2 \times 10^{-5}$, or greater than about $5 \times 10^{-5}$, or greater than about $10^{-4}$, or greater than about $5 \times 10^{-4}$, or greater than about $10^{-3}$, along at least one in-plane direction and for at least one wavelength in a visible wavelength range from about 420 nm to about 680 nm or from about 450 nm to about 650 nm. In some embodiments, the layer(s) including optically absorptive material may have a relatively low optical absorption in a near infrared wavelength range. For example, each of the layer(s) may have an extinction coefficient k (e.g., corresponding to one or more of k1, k2, ks1, ks2, ka1, ka2) of less than about $10^{-3}$, or less than about $5 \times 10^{-4}$, or less than about $2 \times 10^{-4}$, or less than about $10^{-4}$ along each in-plane direction and for each wavelength in a wavelength range from about 750 nm to at least about 1300 nm (e.g., from about 750 nm to about 1300 nm or from about 750 nm to about 1400 nm).

Suitable optically absorptive materials include, for example, dyes, pigments, or a combination thereof. In some embodiments, two, three, four, or more different optically absorptive materials are included in order to adjust the reflected and/or transmitted color. For example, a blue dye or pigment, a yellow or green dye or pigment, and a red dye or pigment may be used. The optically absorptive materials may be included in a same layer or may be separately included in different layers. Suitable dyes and pigments include, for example. Disperse Blue 60 ($C_{20}H_{17}N_3O_5$; CAS Number 12217-80-0); Pigment Yellow 147 ($C_{37}H_{21}N_5O_4$; CAS Number 4118-16-5); red azo dyes such as Red Dye 40 ($C_{18}H_{14}N_2Na_2O_8S_2$; CAS Number 25956-17-6); anthraquinone dyes pr pigments such as Solvent Yellow 163 ($C_{26}H_{16}O_2S_2$; CAS Number 13676-91-0). Pigment Red 177 ($C_{28}H_{16}N_2O_4$; CAS Number 4059-63-2), and Disperse Red 60 ($C_{20}H_{13}N_2O_4$; CAS Number 12223-37-9); perylene dyes or pigments such as Pigment Black 31 ($C_{40}H_{26}N_2O_4$; CAS Number 67075-37-0). Pigment Black 32 ($C_{40}H_{26}N_2O_6$; CAS Number 83524-75-8), and Pigment Red 149 ($C_{40}H_{26}N_2O_4$; CAS Number 4948-15-6); and the blue, yellow, red and cyan dyes PD-325H, PD-335H, PD-104 and PD-318H, respectively, available from Mitsui Fine Chemicals. Tokyo Japan. The amount and color of the dyes/pigments can be selected based on optical properties of a corresponding optical film not including optically absorptive material. For example, in embodiments where a color shift of the optical film not including optically absorptive material is due primarily to a third order harmonic of an infrared reflection band, the dyes/pigments can be selected to have an absorption spectrum overlapping the third order harmonic throughout a desired range of incidence angles and the amount of dyes/pigments can be selected to reduce reflection from the third order harmonic to a degree suitable for reducing the color shift to a desired range. As another example, in embodiments where a color shift of the optical film not including optically absorptive material is due primarily to a mismatch in reflection strength of second and third order harmonics of an infrared reflection band, the dyes/pigments can be selected to have an absorption spectrum overlapping the harmonic having a stronger reflection throughout a desired range of incidence angles and the amount of dyes/pigments can be selected to reduce reflection from the harmonic to approximately match the reflection strength of the other harmonic.

A multilayer optical film may be characterized in terms of color of light reflected from the optical film and/or of light transmitted through the optical film when a substantially white light is incident on the optical film. The substantially white incident light may be from an illuminant D65, which is a standard illuminant defined by the International Commission on Illumination, commonly known as CIE based on its French name Commission Internationale de l'Éclairage. The light from the illuminant D65 can be unpolarized light. The color of the reflected and transmitted lights may be characterized in terms of the a* and/or b* colorimetric parameters of the CIE L*a*b* color space (also referred to as the CIE 1976 L*a*b* color space or the CIELAB color space). The a* and b* colorimetric parameters can be determined as described in ASTM E308-18 "Standard Practice for Computing the Colors of Objects by Using the CIE System". The ASTM E308-18 standard also provides the relative spectral power distribution of the standard illuminant D65.

Figure 3:
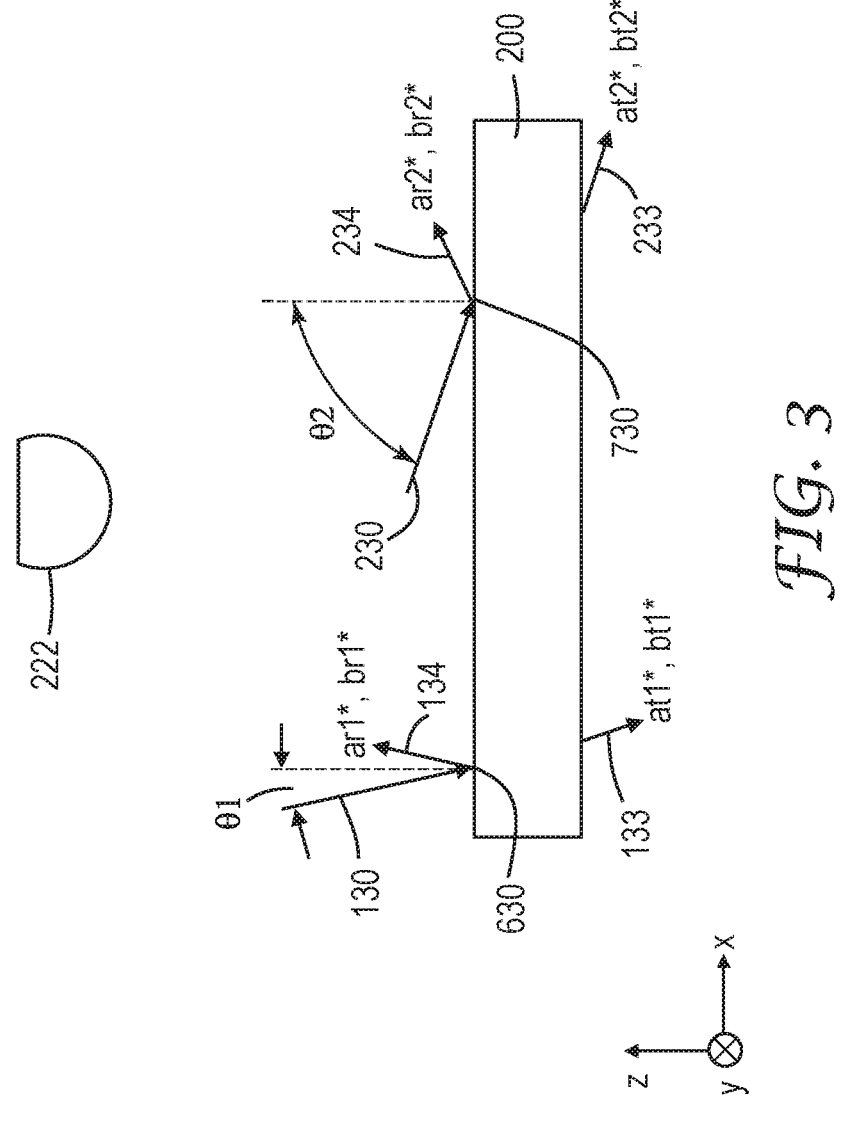
FIG. 3 is a schematic cross-sectional view of an optical element illustrating light incident on the optical element, according to some embodiments.

FIG. 1A schematically illustrates a light 180 incident on the optical film 100 in an incident plane (plane defined by the direction of incident light and the surface normal). In the illustrated embodiment, the incident plane is the x-z plane, referring to the illustrated x-y-z coordinate system. A p-polarization state 131 (electric field in the incident plane) and an s-polarization state 132 (electric field orthogonal to the incident plane) are illustrated. A light 180' substantially normally incident on the optical film 100 is also illustrated. Light 180 and light 180' are incident on a major surface 127 of the multilayer optical film 100. FIG. 3 is a schematic cross-sectional view of an optical element 200 illustrating light 130 and light 230 incident on a major surface 227 of the optical element 200, according to some embodiments. The optical element 200 may be an optical film corresponding to optical film 100 or optical film 100', for example. Alternatively, the optical element 200 may be a plurality of optical repeat units (or a plurality of alternating first and second layers) corresponding to the plurality of optical repeat units 110 of the optical film 100 or 100', for example. Alternatively, the optical element 200 may be a glass laminate corresponding to the glass laminate 101, for example. Light 130 is incident on the optical element 200 at a first incident angle θ1 and light 230 is incident on the optical element 200 at a second incident angle θ2. Light 130 and/or light 230 may be from an illuminant D65. The illuminant 222 schematically indicated in FIG. 3 may be an illuminate D65, for example. The optical element 200 transmits a portion of the incident light 130 as a transmitted light 133 and reflects a portion of the incident light 130 as a reflected light 134. The transmitted light 133 has, in a CIE L*a*b* color space, an "a*" colorimetric parameter at1* and a "b*" colorimetric parameter bt1*. The reflected light 134 has, in a CIE L*a*b* color space, an "a*" colorimetric parameter ar1* and a "b*" colorimetric parameter br1*. The optical element 200 transmits a portion of the incident light 230 as a transmitted light 233 and reflects a portion of the incident light 230 as a reflected light 234. The transmitted light 233 has, in a CIE L*a*b* color space, an "a*" colorimetric parameter at2* and a "b*" colorimetric parameter bt2*. The reflected light 234 has, in a CIE L*a*b* color space, an "a*" colorimetric parameter ar2* and a "b*" colorimetric parameter br2*.

Light 130 is incident on the optical element 200 at incident location 630 and light 230 is incident on the optical element 200 at incident location 730. In general, optical properties (e.g., low color shift of reflected and/or transmitted light) described herein can hold for light incident on the optical film 100, 100' from at least one side of the optical film (e.g., on major surface 127 or 227 and/or on the major surface opposite 127 or 227) and for at least one incident location. For example, in some embodiments, optically absorptive material is included in a first skin layer, but not in the opposite skin layer, of the optical film. In some such embodiments, the reflected light can have different a* and/or b* colorimetric parameters for light incident on the first skin layer than for light incident on the second skin layer. In some embodiments, optical properties described herein can hold for each incident location across at least 60%, or at least 80%, or at least 90%, or at least 95% by area (e.g., area of the major surface on which the light is incident or area in a top plan view) of the optical film for light incident on one or both sides of the optical film, or can hold for each incident location across the optical film for light incident on one or both sides of the optical film.

An incident angle is an angle of a direction of light incident on a surface relative to a normal to the surface and is in a range of 0 degrees to 90 degrees. When optical properties (e.g., transmittance or reflectance or colorimetric parameters) of an optical element (e.g., an optical film or a plurality of optical repeat units) is specified, the incident angle is the incident angle at the surface of the optical element where the light is incident, unless indicated otherwise. The incident angle θ1 may be less than about 10 degrees, or less than about 6 degrees, or less than about 3 degrees. The incident angle θ1 may be about 0 degrees (e.g., about 2 degrees or less), for example. The incident angle θ2 may be at least about 40 degrees, or at least about 50 degrees, or at least about 60 degrees, or at least about 65 degrees, for example. The incident angle θ2 may be up to about 85 degrees, for example. The incident angle θ2 may be about 40 degrees, or about 50 degrees, or about 60 degrees, or about 65 degrees, or about 70 degrees, for example.

Figure 4:
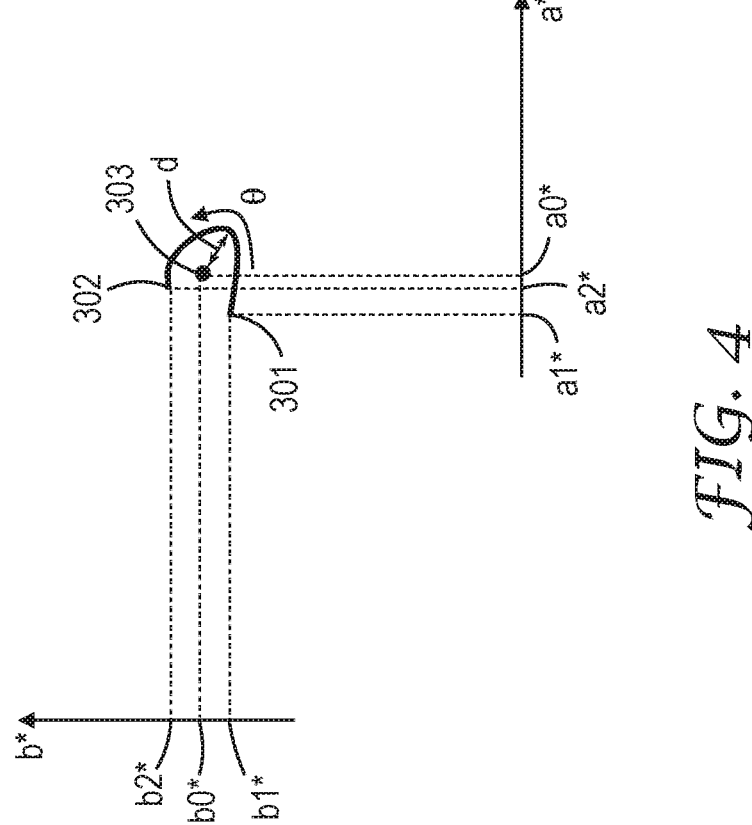
FIG. 4 is a schematic illustration of a CIE L*a*b* color space showing a change in a* and b* colorimetric parameters as an incident angle changes, according to some embodiments.

FIG. 4 is a schematic illustration of a CIE L*a*b* color space showing a change in a* and b* colorimetric parameters as an incident angle θ changes continuously from a first incident angle (e.g., θ1 which may be less than about 10 degrees) at point 301 having color space coordinates a1*, b1* to a second incident angle (e.g., θ2 which may be about 40 degrees or greater) at point 302 having color space coordinates a2*, b2*, according to some embodiments. The illustrated a*, b* parameters may be for reflected light or for transmitted light. A maximum Euclidean distance d in the CIE L*a*b* color space from a predetermined color space location 303 having predetermined color space coordinates a0*, b0* as the incident angle changes continuously from the first incident angle to the second incident angle is indicated. The predetermined color space location 303 may correspond to a substantially white light (e.g., each of |a0|* and |b0*| maybe less than about 15, or less than about 10), for example, or may correspond to a light having a predetermined color (e.g., at least one of |a0|* and |b0*| may be greater than about 25 or greater than about 40). In some embodiments, each of |a0|* and |b0*| is less than about 35, or less than about 30, or less than about 20, or less than about 18, or less than about 15, or less than about 12, or less than about 10, or less than about 8, or less than about 7, or less than about 6, or less than about 5, or less than about 4, or less than about 3, or less than about 2, or less than about 1. In some embodiments, |a0|)*| and/or |b0*| is greater than about 20, or greater than about 30, or greater than about 35, or greater than about 40. In some embodiments, the maximum Euclidean distance d is less than about less than about 35, or less than about 30, or less than about 20, or less than about 18, or less than about 15, or less than about 12, or less than about 10, or less than about 8, or less than about 7, or less than about 6, or less than about 5, or less than about 4, or less than about 3, or less than about 2, or less than about 1.

In some embodiments, for a light 130, 230 incident on the multilayer optical film 100, 100' from an illuminant D65, the multilayer optical film reflects and transmits portions of the incident light as reflected (134, 234) and transmitted (133, 233) lights. In some embodiments, the reflected and transmitted lights have, in a CIE L*a*b* color space, respective "a*" colorimetric parameters ar1* and at1* for an incident angle θ1 of less than about 10 degrees and respective "a*" colorimetric parameters ar2* and at2* for an incident angle θ2 of about 40 degrees, where a magnitude of a difference between each of at1* and at2*, and ar1* and ar2* is less than about 20, or less than about 15, or less than about 12, or less than about 10, or less than about 8, or less than about 7, or less than about 6, or less than about 5, or less than about 4, or less than about 3, or less than about 2, or less than about 1. In some such embodiments, or in other embodiments, the reflected and transmitted lights have, in the CIE L*a*b* color space, respective "b*" colorimetric parameters br1* and bt1* for an incident angle of less than about 10 degrees and respective "b*" colorimetric parameters br2* and bt2* for an incident angle of about 40 degrees, a magnitude of a difference between each of br1* and br2*, and bt1* and bt2* is less than about 35, or less than about 30, or less than about 25, or less than about 20, or less than about 18, or less than about 15, or less than about 12, or less than about 10, or less than about 8, or less than about 7, or less than about 6, or less than about 5, or less than about 4, or less than about 3, or less than about 2, or less than about 1. In some embodiments, for a predetermined "a*" colorimetric parameter a0*, each of |at1*−a0*|, |at2*−a0*|, |ar1*−a0)*|, and |ar2*−a0)*| is less than about 20, or less than about 18, or less than about 15, or less than about 12, or less than about 10, or less than about 8, or less than about 7, or less than about 6, or less than about 5, or less than about 4, or less than about 3, or less than about 2, or less than about 1. In some such embodiments, or in other embodiments, for a predetermined "b*" colorimetric parameter b0*, each of |bt1*−b0*|, |bt2*−b0)*|, |br1*−b0*|, and |br2*−b0)*| is less than about 35, or less than about 30, or less than about 25, or less than about 20, or less than about 18, or less than about 15, or less than about 12, or less than about 10, or less than about 8, or less than about 7, or less than about 6, or less than about 5, or less than about 4, or less than about 3, or less than about 2, or less than about 1. In some such embodiments, or in other embodiments, for a predetermined "a*" colorimetric parameter a0)* and a predetermined "b*" colorimetric parameter b0*, each of |bt1*−b0*|, |bt2*−b0)*|, |at1*−a0)*|, and |at2*−a0)*| is less than about 35, or less than about 30, or less than about 25, or less than about 20, or less than about 18, or less than about 15, or less than about 12, or less than about 10, or less than about 8, or less than about 7, or less than about 6, or less than about 5, or less than about 4, or less than about 3, or less than about 2, or less than about 1. In some such embodiments, or in other embodiments, for a predetermined "a*" colorimetric parameter a0)* and a predetermined "b*" colorimetric parameter b0*, each of |br1*−b0*|, |br2*−b0)*|, |ar1*−a0) *|, and |ar2*−a0*| is less than about 35, or less than about 30, or less than about 25, or less than about 20, or less than about 18, or less than about 15, or less than about 12, or less than about 10, or less than about 8, or less than about 7, or less than about 6, or less than about 5, or less than about 4, or less than about 3, or less than about 2, or less than about 1. |a0*| can be less than about 10 or greater than about 10 or |a0*| can be in any range described elsewhere herein. |b0*| can be less than about 10 or greater than about 10 or |b0*| can be in any range described elsewhere herein.

In some embodiments, the reflected and transmitted lights have, in a CIE L*a*b* color space, respective "a*" colorimetric parameters ar1* and at1* for an incident angle θ1 of less than about 10 degrees and respective "a*" colorimetric parameters ar2* and at2* for an incident angle θ2 of about 60 degrees, where a magnitude of a difference between each of at1* and at2*, and ar1* and ar2* is less than about 35, or less than about 30, or less than about 20, or less than about 15, or less than about 12, or less than about 10, or less than about 8, or less than about 7, or less than about 6, or less than about 5, or less than about 4, or less than about 3. In some such embodiments, or in other embodiments, the reflected and transmitted lights have, in the CIE L*a*b* color space, respective "b*" colorimetric parameters br1* and bt1* for an incident angle of less than about 10 degrees and respective "b*" colorimetric parameters br2* and bt2* for an incident angle of about 60 degrees, a magnitude of a difference between each of br1* and br2*, and bt1* and bt2* being less than about 35, or less than about 30, or less than about 25, or less than about 20, or less than about 18, or less than about 15, or less than about 12, or less than about 10, or less than about 8, or less than about 7, or less than about 6, or less than about 5, or less than about 4, or less than about 3. In some embodiments, for a predetermined "a*" colorimetric parameter a0*, each of |at1*−a0*|, |at2*−a0*|, |ar1*−a0*|, and |ar2*−a0*| is less than about 35, or less than about 30, or less than about 25, or less than about 20, or less than about 18, or less than about 15, or less than about 12, or less than about 10, or less than about 8, or less than about 7, or less than about 6, or less than about 5, or less than about 4, or less than about 3, or less than about 2. In some such embodiments, or in other embodiments, for a predetermined "b*" colorimetric parameter b0*, each of |bt1*−b0*|, |bt2*−b0*|, |br1*−b0*|, and |br2*−b0*| is less than about 35, or less than about 30, or less than about 25, or less than about 20, or less than about 18, or less than about 15, or less than about 12, or less than about 10, or less than about 8, or less than about 7, or less than about 6, or less than about 5, or less than about 4, or less than about 3, or less than about 2.

In some embodiments, for a light 130, 230 incident on the multilayer optical film 100, 100' from an illuminant D65, the multilayer optical film reflects and transmits portions of the incident light as reflected (134, 234) and transmitted (133, 233) lights. In some embodiments, the reflected and transmitted lights have, in a CIE L*a*b* color space, respective "a*" colorimetric parameters ar1* and at1* for an incident angle θ1 of less than about 10 degrees and respective "a*" colorimetric parameters ar2* and at2* for an incident angle θ2≥ 01. In some embodiments, the reflected and transmitted lights have, in a CIE L*a*b* color space, respective "b*" colorimetric parameters br1* and bt1* for the incident angle θ1 of less than about 10 degrees and respective "b*" colorimetric parameters br2* and bt2* for the incident angle θ2≥ θ1. In some embodiments, a magnitude of a difference between each of at1* and at2*, ar1 and ar2*, bt1* and bt2*, and ar1* and ar2* remains less than about less than about 35, or less than about 30, or less than about 25, or less than about 20, or less than about 18, or less than about 15, or less than about 12, or less than about 10, or less than about 8, or less than about 7, or less than about 6, or less than about 5, or less than about 4, or less than about 3, or less than about 2 as the incident angle θ2 varies continuously from 01 to at least about 40 degrees. The angle of at least about 40 degrees can be up to about 85 degrees, or up to about 80 degrees, or up to about 75 degrees, or up to about 70 degrees, for example. The angle of at least about 40 degrees can be about 40 degrees, or about 50 degrees, or about 60 degrees, or about 65 degrees, for example.

In some embodiments, for a light (e.g., 130, 230) incident on the multilayer optical film 100, 100' from an illuminant D65 at an incident angle (e.g., θ1, θ2), the multilayer optical film transmits a portion of the incident light as a transmitted light (e.g., 133, 233) having, in a CIE L*a*b* color space, an "a*" colorimetric parameter at* (e.g., corresponding to at1* or at2*) and a "b*" colorimetric parameter bt* (e.g., corresponding to bt1* or bt2*), where a magnitude of each of at* and bt* remains less than about 35, or less than about 30, or less than about 25, or less than about 20, or less than about 18, or less than about 15, or less than about 12, or less than about 10, or less than about 8, or less than about 7, or less than about 6, or less than about 5, or less than about 4 as the incident angle varies continuously from less than about 10 degrees (e.g., θ1) to at least about 40 degrees (e.g., θ2). In some such embodiments, or in other embodiments, for a light (e.g., 130, 230) incident on the multilayer optical film 100, 100' from an illuminant D65 at an incident angle (e.g., θ1, θ2), the multilayer optical film reflects a portion of the incident light as a reflected light (e.g., 134, 234) having, in a CIE L*a*b* color space, an "a*" colorimetric parameter ar* (e.g., corresponding to ar1* or ar2*) and a "b*" colorimetric parameter br* (e.g., corresponding to br1* or br2*), where a magnitude of each of ar* and br* remains less than about 45, or less than about 40, or less than about 35, or less than about 30, or less than about 25, or less than about 20, or less than about 18, or less than about 15, or less than about 12, or less than about 10, or less than about 8, or less than about 7, or less than about 6, or less than about 5, or less than about 4 as the incident angle varies continuously from less than about 10 degrees (e.g., θ1) to at least about 40 degrees (e.g., θ2). In some embodiments, the magnitude of each of at*, bt*, ar*, and br* remains less than about 30, or less than about 25, or less than about 20, or less than about 18, or less than about 15, or less than about 12, or less than about 10, or less than about 8, or less than about 7, or less than about 6, or less than about 5, or less than about 4 as the incident angle varies continuously from less than about 10 degrees to at least about 40 degrees. The angle of less than about 10 degrees can be in any range described elsewhere herein for 01. The angle of at least about 40 degrees can be about 40 degrees, or about 50 degrees, or about 60 degrees, or about 65 degrees, for example, or can be in any range described elsewhere herein for 02.

Figure 5:
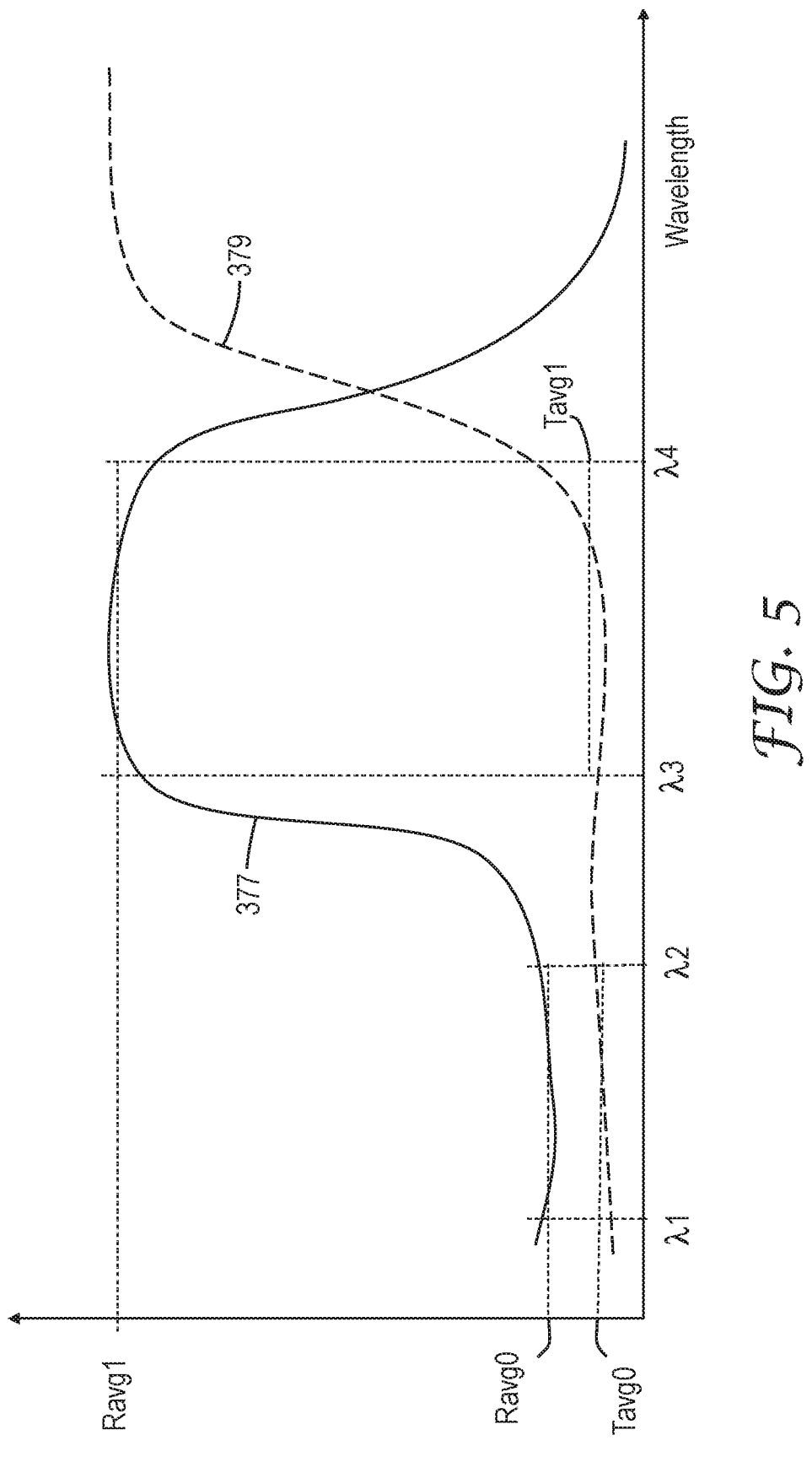
FIG. 5 is a schematic plot of optical reflectance and optical transmittance of a multilayer optical film, according to some embodiments.

FIG. 5 is a schematic plot of optical reflectance 377 and optical transmittance 379 of a multilayer optical film 100, 100' for a substantially normally incident light 180' (e.g., within about 20 degrees, or within about 10 degrees, or within about 5 degrees of normally incident or nominally normally incident) for at least one polarization state (e.g., for at least one of 131 and 132), according to some embodiments. In some embodiments, the optical reflectance and optical transmittance are about the same for orthogonal first and second polarization states (e.g., the optical film may be biaxially oriented along orthogonal first and second in-plane directions). In other embodiments, the optical reflectance and optical transmittance may differ for the first and second polarization states. For example, the optical film may be stretched differently in down web and cross web directions to produce different reflection spectra for incidence planes in the down web and cross web directions. The optical reflectance 377 has an average Ravg0 in a wavelength range of λ1 to λ2 and an average Ravg1 in a wavelength range of λ3 to λ4. The optical transmittance 379 has an average Tavg0 in the wavelength range of λ1 to λ2 and an average Tavg1 in a wavelength range of λ3 to λ4. The multilayer optical film has an average optical absorptance (e.g., due to optically absorptive material dispersed in at least one layer of the multilayer optical film) in the wavelength range of λ1 to λ2 of 100 percent–Ravg0–Tavg0.

For some applications (e.g., many sunroof applications), it may be desired to have relatively low reflectance and transmittance for visible light (e.g., each less than 40%) and relatively high reflectance for near infrared light (e.g., greater than 60%). For other applications, a higher reflectance or transmittance for visible light may be desired. In some embodiments, Tavg0 for the wavelength range of λ1 to λ2 is no more than about 65%, or no more than about 60%, or no more than about 50%, or no more than about 45%, or no more than about 40%, or no more than about 35%, or no more than about 30%, or no more than about 25%, or no more than about 20%, or no more than about 15%. In some embodiments, the average transmittance Tavg0 for the wavelength range of λ1 to λ2 is at least about 0.5%, or at least about 0.75, or at least about 1%, or at least about 1.5%, or at least about 2%. In some embodiments, the average reflectance Ravg0) for the wavelength range of λ1 to λ2 is less than about 65%, or less than about 60%, or less than about 50%, or less than about 45%, or less than about 40%, or less than about 35%, or less than about 30%, or less than about 25%, or less than about 20%, or less than about 15%. In some embodiments, the average reflectance Ravg1 for the wavelength range of λ3 to λ4 is greater than about 50%, or greater than about 60%, or greater than about 70%, or greater than about 75%, or greater than about 80%, or greater than about 85%. In some embodiments, the average transmittance Tavg1 for the wavelength range of λ3 to λ4 is less than about 40%, or less than about 30%, or less than about 20%, or less than about 10%. In some embodiments, a difference between the average reflectance Ravg1 for the wavelength range of λ3 to λ4 and the average reflectance Ravg0 for the wavelength range of λ1 to λ2 is at least 10%, or at least 20%, or at least 30%, or at least 40%, or at least 50%, or at least 60%. In some embodiments, a difference between the average transmittance Tavg0 for the wavelength range of λ1 to λ2 and the average transmittance Tavg1 for the wavelength range of λ3 to λ4 is at least 5%, or at least 10%, or at least 20%, or at least 30%, or at least 40%, or at least 50%. The optical reflectances Ravg0 and Ravg1 and/or the optical transmittances Tavg0 and Tavg1 may be in any of these ranges for at least one polarization state or for each of two mutually orthogonal polarization states (e.g., 131 and 132). In some embodiments, the wavelength A1 is in a range of about 400 nm to about 450 nm. The wavelength λ1 may be about 400 nm, or about 420 nm, or about 450 nm, for example. In some embodiments, the wavelength λ2 is in a range of about 650 nm to about 700 nm. The wavelength λ2 may be about 650 nm, or about 680 nm, or about 700 nm, for example. In some embodiments, the wavelength λ3 is in a range of about 800 nm to about 900 nm. The wavelength λ3 may be about 800 nm, or about 850 nm, or about 900 nm, for example. In some embodiments, the wavelength λ4 is in a range of about 1150 nm to about 1400 nm. The wavelength λ4 may be about 1150 nm, or about 1200 nm, or about 1300 nm, or about 1400 nm, for example.

In some embodiments, for a substantially normally incident light 180' and for each of two mutually orthogonal polarization states (e.g., 131 and 132), the multilayer optical film 100, 100' has an average optical reflectance Ravg0 in a visible wavelength range extending from about 450 nm to about 650 nm of less than about 70%, or less than about 60%, or less than about 50%, or less than about 40%, or less than about 35%, or less than about 30%, or less than about 25%, or less than about 20%, or less than about 15% and an average optical reflectance Ravg1 in an infrared wavelength range extending from about 850 nm to about 1200 nm of greater than Ravg0 plus about 10%. In some embodiments. Ravg1 is greater than Ravg0 plus about 20%, or greater than Ravg0 plus about 30%, or greater than Ravg0 plus about 40%, or greater than Ravg0 plus about 50%. In some embodiments, Ravg1 is greater than about 50%, or greater than about 60%, or greater than about 65%, or greater than about 70%, or greater than about 75%, or greater than about 80%, or greater than about 85%.

In some embodiments, for a substantially normally incident light 180' and for each of two mutually orthogonal polarization states (e.g., 131 and 132), the multilayer optical film 100, 100' has an average optical transmittance Tavg0 in a visible wavelength range extending from about 450 nm to about 650 nm of about 0.5% to about 40%, an average optical reflectance Ravg0 in the visible wavelength range of less than about 40%, and an average optical reflectance Ravg1 in an infrared wavelength range extending from about 850 nm to about 1200 nm of greater than about 60%. In some embodiments, the average optical transmittance Tavg0 in the visible wavelength range is at least about 0.6%, or at least about 0.75%, or at least about 1%. In some embodiments, the average optical transmittance Tavg0 in the visible wavelength range is no more than about 35%, or no more than about 30%, or no more than about 25%, or no more than about 20%, or no more than about 15%. For example, the average optical transmittance Tavg0 in the visible wavelength range may be in a range of about 0.75% to about 30%, or about 1% to about 20%. In some embodiments, the average optical reflectance Ravg0 in the visible wavelength range is less than about 35%, or less than about 30%, or less than about 25%, or less than about 20%, or less than about 15%. In some embodiments, the average optical reflectance Ravg0 in the visible wavelength range is at least about 1%, or at least about 3%, or at least about 5%, or at least about 8%. In some embodiments, the average optical reflectance Ravg1 in the infrared wavelength range is greater than about 65%, or greater than about 70%, or greater than about 75%, or greater than about 80%, or greater than about 85%. The average optical reflectance Ravg1 in the infrared wavelength range can be up to about 95%, for example. In some embodiments, for a substantially normally incident light 180' and for each of two mutually orthogonal polarization states (e.g., 131 and 132), the multilayer optical film 100, 100' has an average optical reflectance in an infrared wavelength range extending from about 850 nm to about 1300 nm or from about 850 nm to about 1400 nm of greater than about 60%. The average optical reflectance in such infrared wavelength ranges can be in any of the ranges described for the average optical reflectance in the infrared wavelength range extending from about 850 nm to about 1200 nm.

In some embodiments, the multilayer optical film 100, 100' includes optically absorptive material dispersed in at least one layer of the multilayer optical film. Optically absorptive material dispersed in a layer refers to material that significantly increases an optical absorption of the layer (e.g., increases an extinction coefficient of the layer by at least a factor of about 2, or in some cases, at least a factor of about 5 or at least a factor of about 10, for at least one wavelength in a visible wavelength range where the visible wavelength range can be from about 400 nm to about 700 nm, or about 420 nm to about 680 nm, or about 450 nm to about 650 nm, for example) compared to the layer without the optically absorptive material. In some embodiments, at least one of the first and second skin layers 121 and 122 includes optically absorptive material (e.g., for at least one wavelength in the visible wavelength range, at least one of ks1 and ks2 may be greater than about $2 \times 10^{-5}$ or in a range described elsewhere herein for a layer including optically absorptive material). In some embodiments, the multilayer optical film 100, 100' includes optically absorptive material where at least a portion of the optically absorptive material is dispersed in the first layers (e.g., for at least one wavelength in the visible wavelength range, k1 may be greater than about $2 \times 10^{-5}$ or in a range described elsewhere herein for a layer including optically absorptive material) or in the second layers (e.g., for at least one wavelength in the visible wavelength range, k2 may be greater than about $2 \times 10^{-5}$ or in a range described elsewhere herein for a layer including optically absorptive material). In some embodiments, the multilayer optical film 100, 100' includes optically absorptive material that includes a first optically absorptive material dispersed in at least one of the first and second skin layers 121 and 122 (e.g., for at least one wavelength in the visible wavelength range, at least one of ks1 and ks2 may be greater than about $2 \times 10^{-5}$ or in a range described elsewhere herein for a layer including optically absorptive material), and a second optically absorptive material dispersed in each of the polymeric first layers 111 (e.g., for at least one wavelength in the visible wavelength range, k1 may be greater than about $2 \times 10^{-5}$ or in a range described elsewhere herein for a layer including optically absorptive material) or in each of the polymeric second layers 112 (e.g., for at least one wavelength in the visible wavelength range, k2 may be greater than about $2 \times 10^{-5}$ or in a range described elsewhere herein for a layer including optically absorptive material), and where the first and second optically absorptive materials have different compositions. The first and second optically absorptive materials typically have different optical absorption spectra. As used herein, "different optical absorption spectra" means that the spectra have different wavelength dependence and do not differ solely in overall absorption scale (e.g., different concentrations of a same dye would not result in different optical absorption spectra). In some embodiments, the optically absorptive material further includes a third optically absorptive material dispersed in at least one of the first and second adhesive layers 141 and 142 (e.g., for at least one wavelength in the visible wavelength range, at least one of ks1 and ks2 may be greater than about $2 \times 10^{-5}$ or in a range described elsewhere herein for a layer including optically absorptive material), where the first, second and third optically absorptive materials have compositions different from each other. The first, second and third optically absorptive materials typically have optical absorption spectra different from each other. Utilizing different optically absorptive materials in different layers allows a wider range of dyes and/or pigments to be used (e.g., different dyes or pigments in different layers don't have to be compatible with each other).

Optical reflectance and transmittance as a function of wavelength for a multilayer optical film can be calculated using standard optical modeling techniques. Such techniques allow the wavelength distribution of the reflected and transmitted light to be determined which allows the CIE a*, b* colorimetric parameters to be calculated.

Figure 6A:
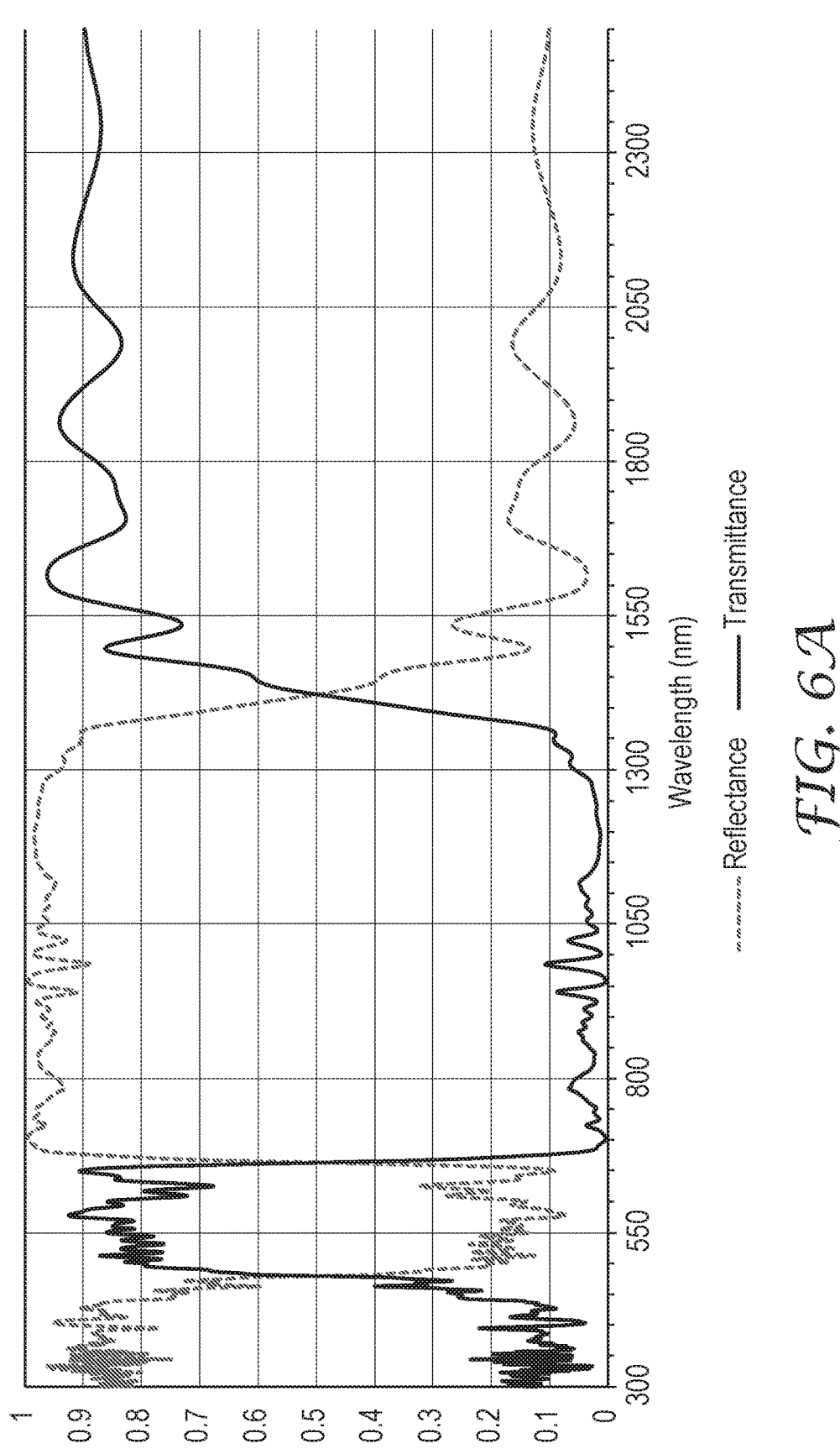
FIG. 6A is a plot of calculated reflectance and transmittance of substantially normally incident light on an optical film not including optically absorptive material.
Figure 6B:
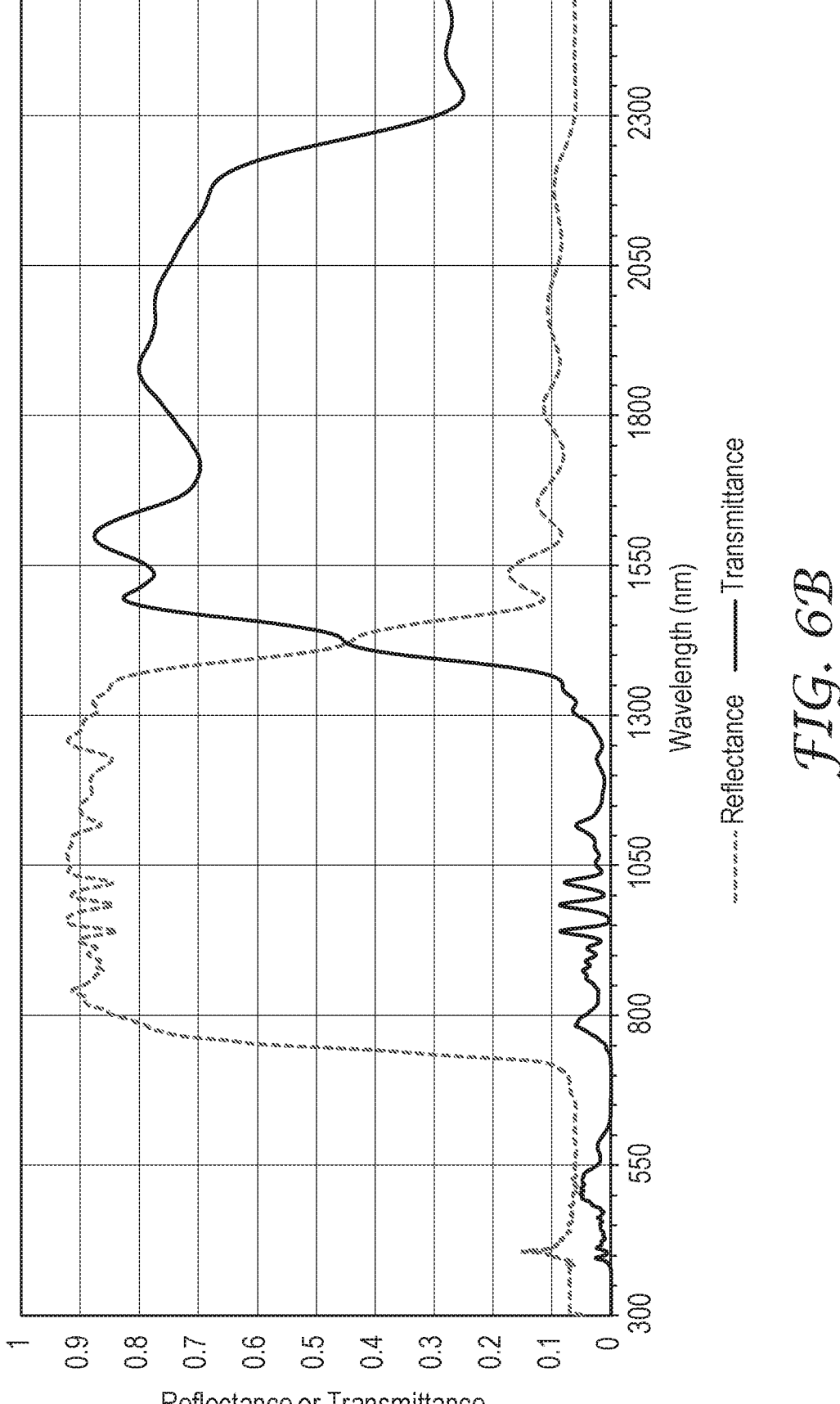
FIG. 6B is a plot of calculated reflectance and transmittance of substantially normally incident light on an optical film corresponding to the optical film of FIG. 6A, but including optically absorptive material, according to some embodiments.

FIG. 6A is a plot of calculated reflectance and transmittance of substantially normally incident light on an illustrative optical film having an f-ratio of 0.5 and not including optically absorptive material. The optical film was substantially biaxially oriented and the transmittance and reflectance were averaged over orthogonal polarization states. The film included a total of 650 layers of alternating PET and coPMMA optical layers disposed between outer PET skin layers and had an f-ratio of 0.5. The PET skin layers were 2 micrometers thick. FIG. 6B is a plot of calculated reflectance and transmittance of substantially normally incident light on a multilayer optical film, according to some embodiments, that corresponds to the optical film of FIG. 6A except that the PET optical layers were modeled as being loaded with a blue dye (Disperse Blue 60), the PET skin layers were modeled as being loaded with a yellow pigment (Pigment Yellow 147, also referred to as PY147), and a colored (red) adhesive (PVB) layer (TROSIFOL Red PVB available from Kuraray America) were included in the model. The PET optical and skin layers had the extinction coefficients shown in FIG. 8 for blue and yellow colored PET layers. The substantially normally incident light was incident on the TROSIFOL Red PVB. The average transmittance and reflectance in the wavelength range of 450 nm to 650 nm for the optical film of FIG. 6B were 2.36% and 6.29%, respectively. The average transmittance and reflectance in the wavelength range of 850 nm to 1300 nm for the optical film of FIG. 6B were 3.01% and 88.91%, respectively.

Figure 7A:
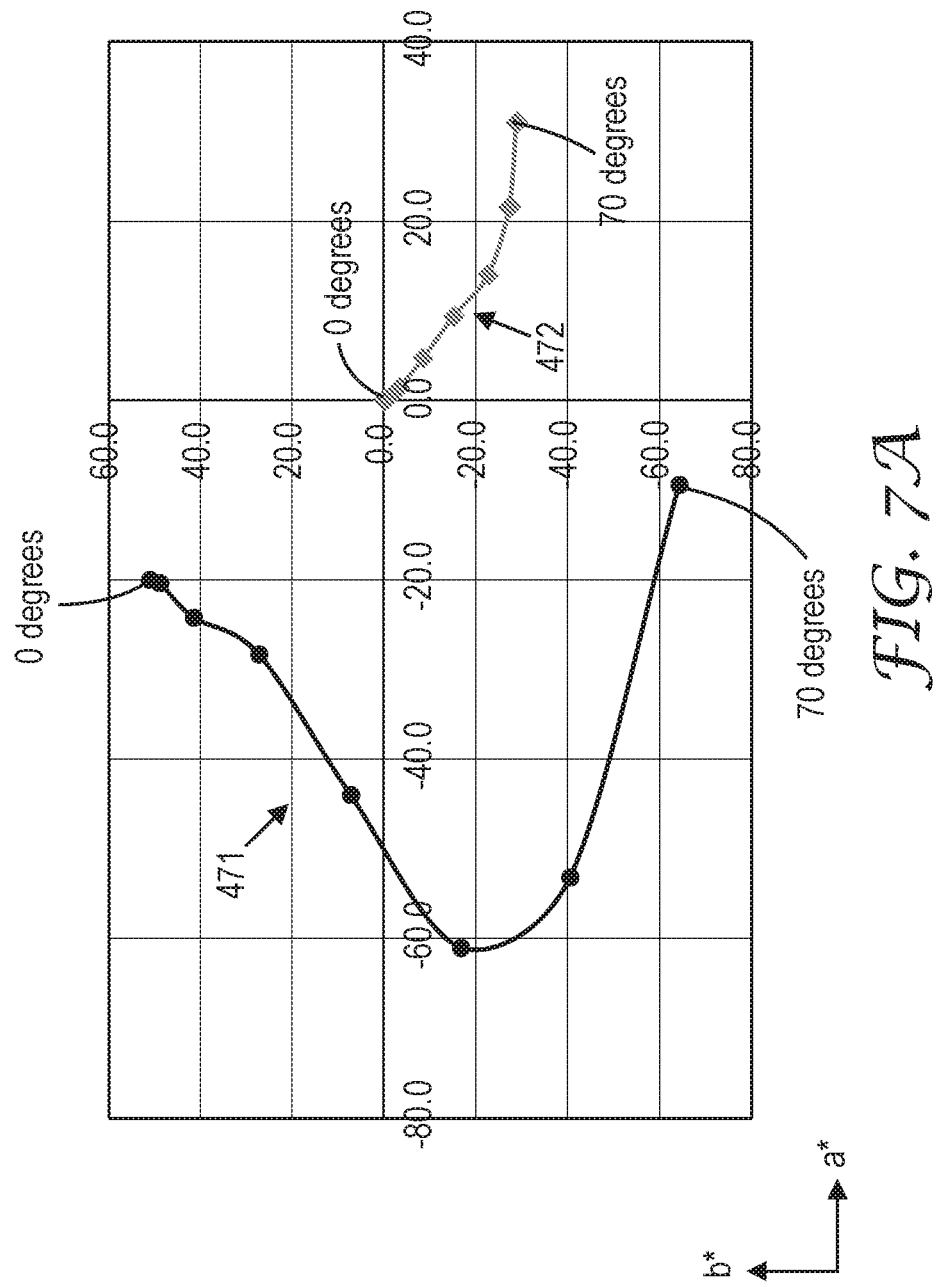
FIGS. 7A-7C are CIE L*a*b* color space plots of calculated a*, b* colorimetric parameters for transmitted or reflected light for incident illuminant D65 light, according to some embodiments.
Figure 7B:
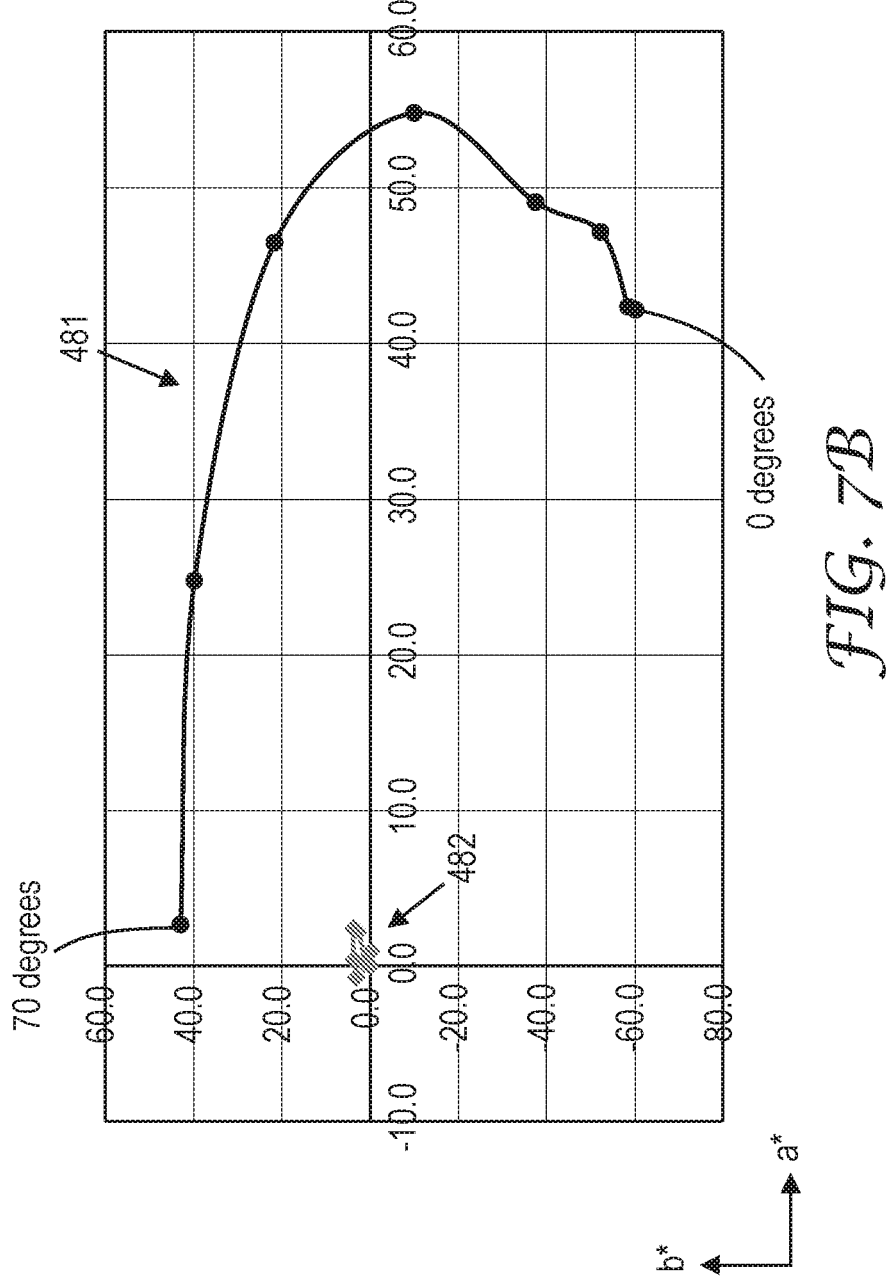
Figure 7C:
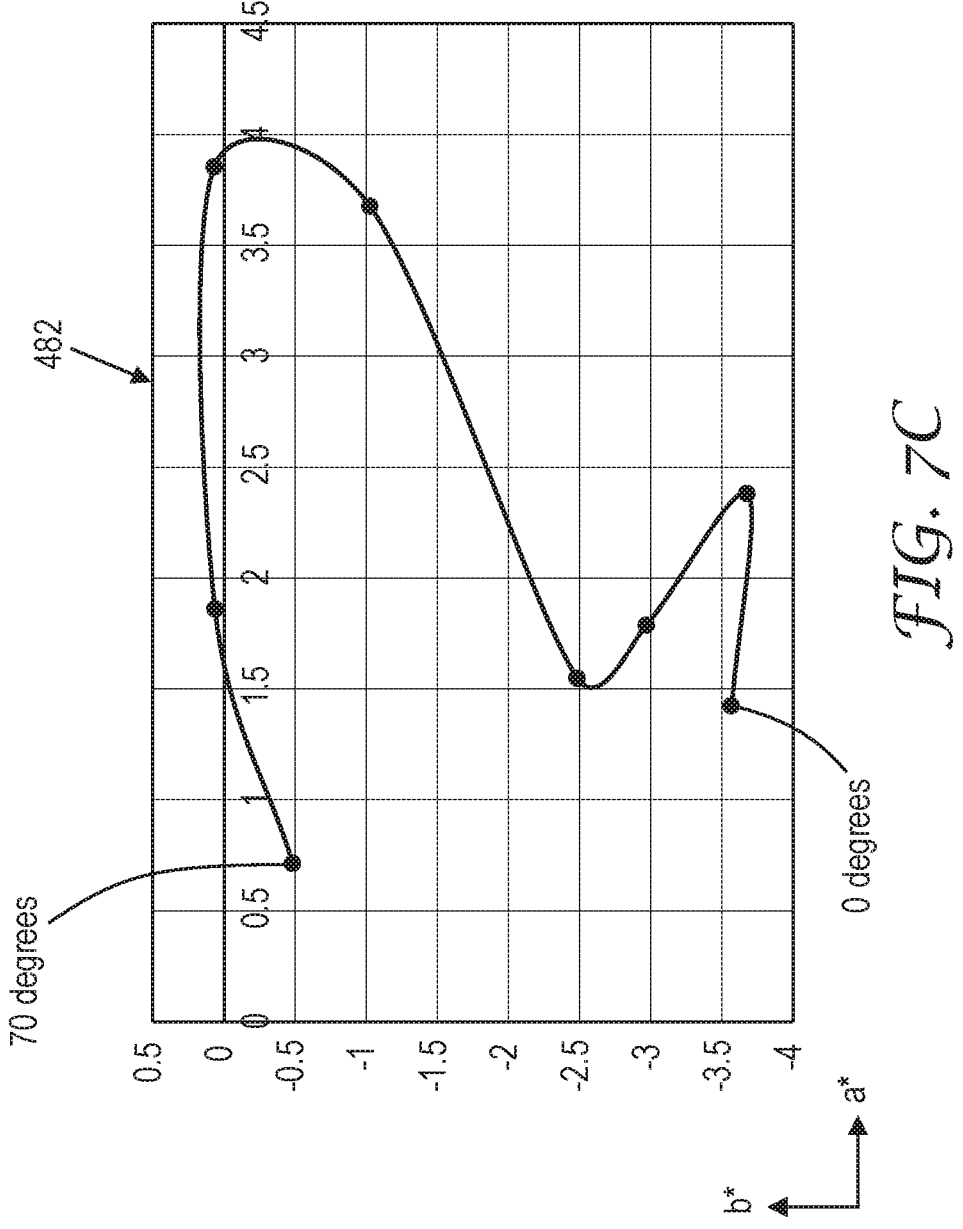

FIGS. 7A-7C are CIE L*a*b* color space plots of calculated a*, b* colorimetric parameters for transmitted or reflected light for incident illuminant D65 light as an incident angle varies from 0 degrees to 70 degrees in 10 degree increments, according to some embodiments. FIG. 7A shows a color space plot 471 for light transmitted through the optical film of FIG. 6A and a color space plot 472 for light transmitted through the optical film of FIG. 6B. The color space plot 472 shows substantially reduced color and substantially reduced color variation with incident angle compared to the color space plot 471. FIG. 7B shows a color space plot 481 for light reflected from the optical film of FIG. 6A and a color space plot 482 for light reflected from the optical film of FIG. 6B. FIG. 7C shows the color space plot 482 on an expanded scale compared to that of FIG. 7B. The color space plot 482 shows highly reduced color and highly reduced color variation with incident angle compared to the color space plot 481.

The shift in color of reflected and/or transmitted light with changing incident angle may be further reduced by changing the f-ratio. It has been found that for light from an illuminant D65 incident on an optical film including alternating PET and coPMMA layers where the PET layers have an f-ratio of 0.675, for example, each of a* and b* for each of transmitted and reflected light for an incident angle of 0 degrees differs from the corresponding a* and b* for an incident angle of 40 degrees by less than 1.

Figure 8:
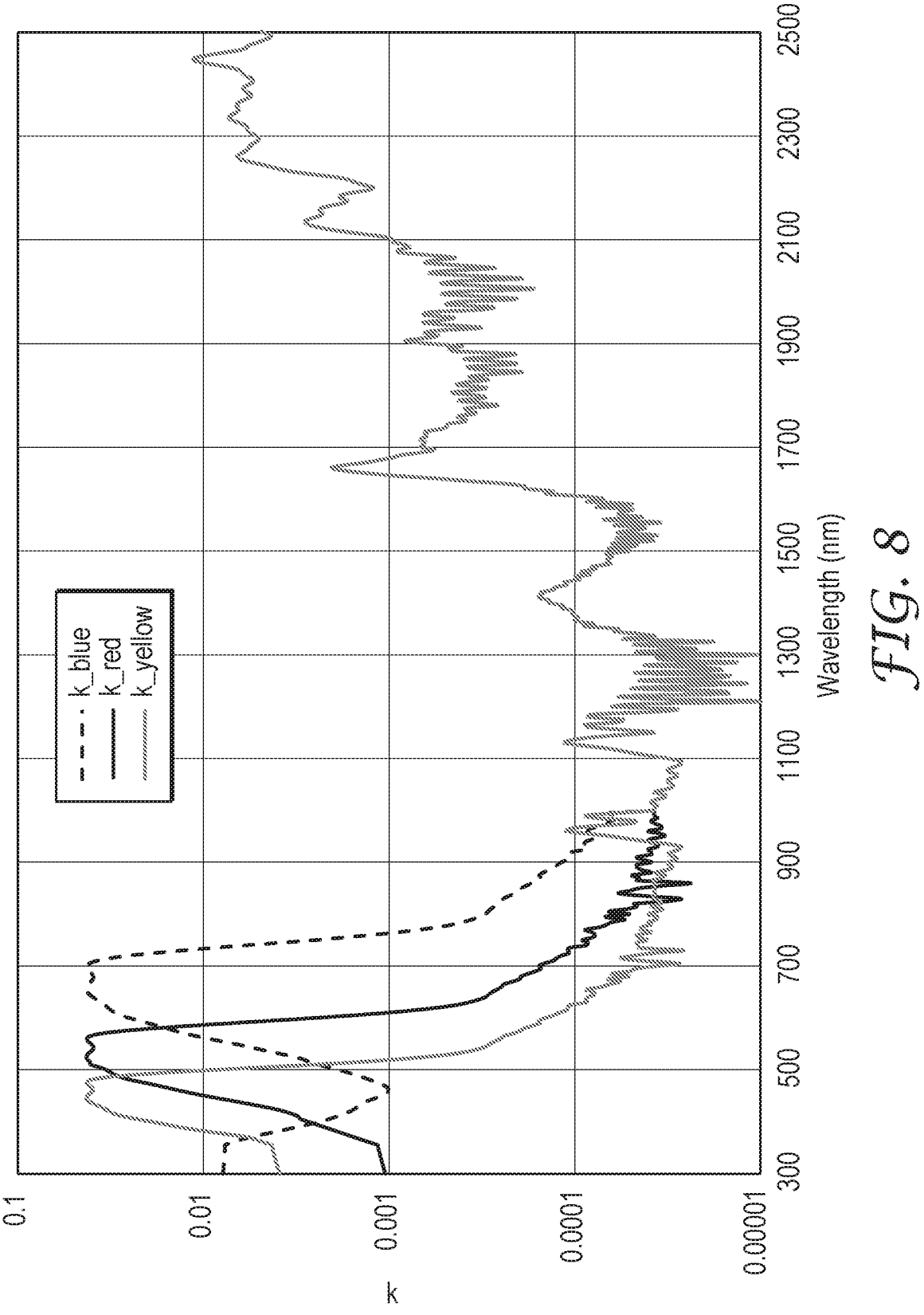
FIG. 8 is a plot of extinction coefficients of polymeric layers containing blue dye, red dye, or yellow pigment, according to some embodiments.

FIG. 8 is a plot of illustrative extinction coefficients of colored PET layers, where each colored PET layer includes blue dye (Disperse Blue 60), red dye (Disperse Red 60), or yellow pigment (PY147) dispersed in the PET, according to some embodiments. Similar plots can be made for other dyes or pigments and/or for other polymeric layers. The extinction coefficients of FIG. 8 can be the extinction coefficients along each of two orthogonal in-plane directions (e.g., the extinction coefficient of a layer along the x- and y-directions can be approximately the same and can be as shown in FIG.

Figure 9A:
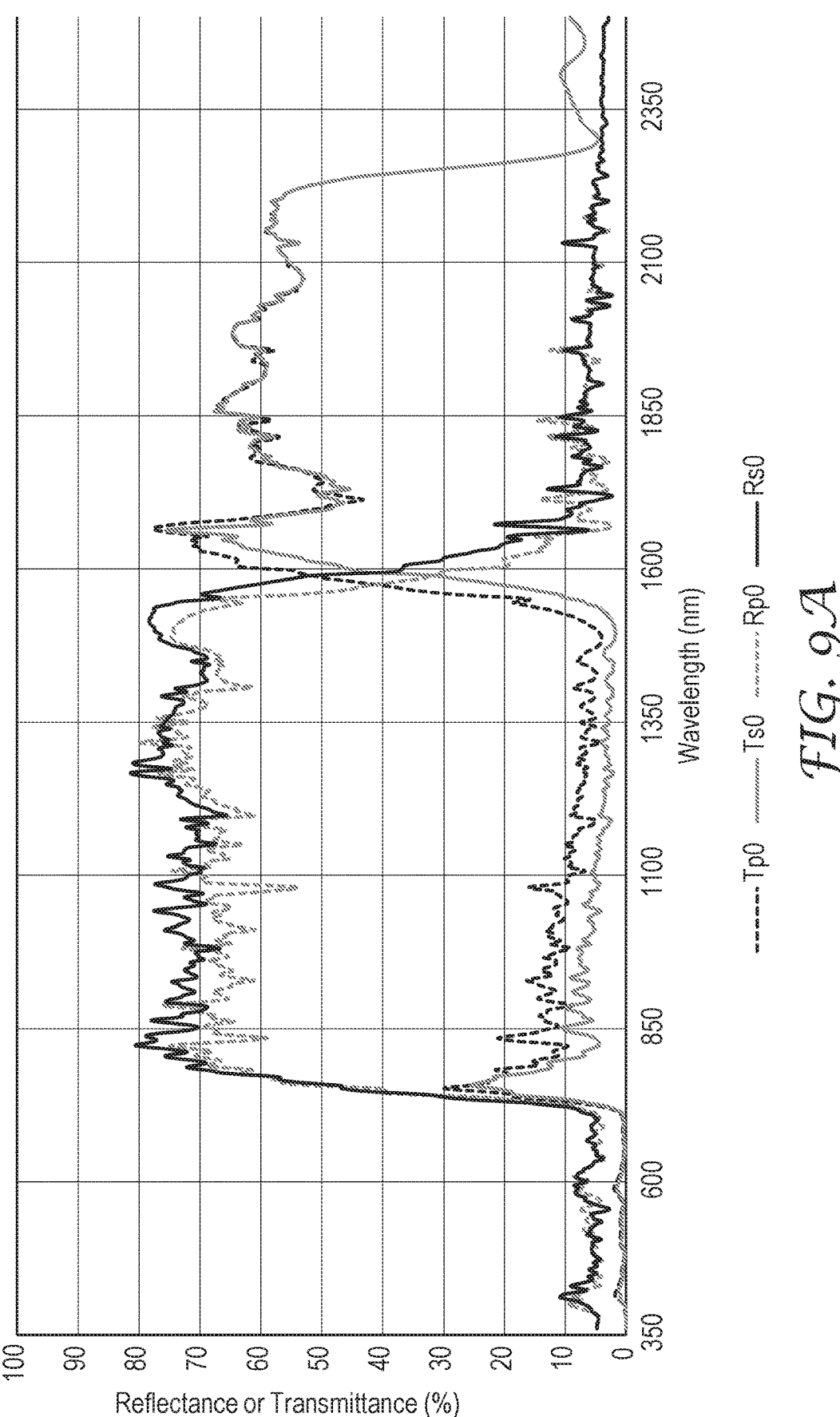
FIGS. 9A-9B are plots of calculated transmittance and reflectance for a glass laminate including a multilayer optical film including skin layers loaded with the blue and red dyes, and yellow pigment of FIG. 8, according to some embodiments.
Figure 9B:
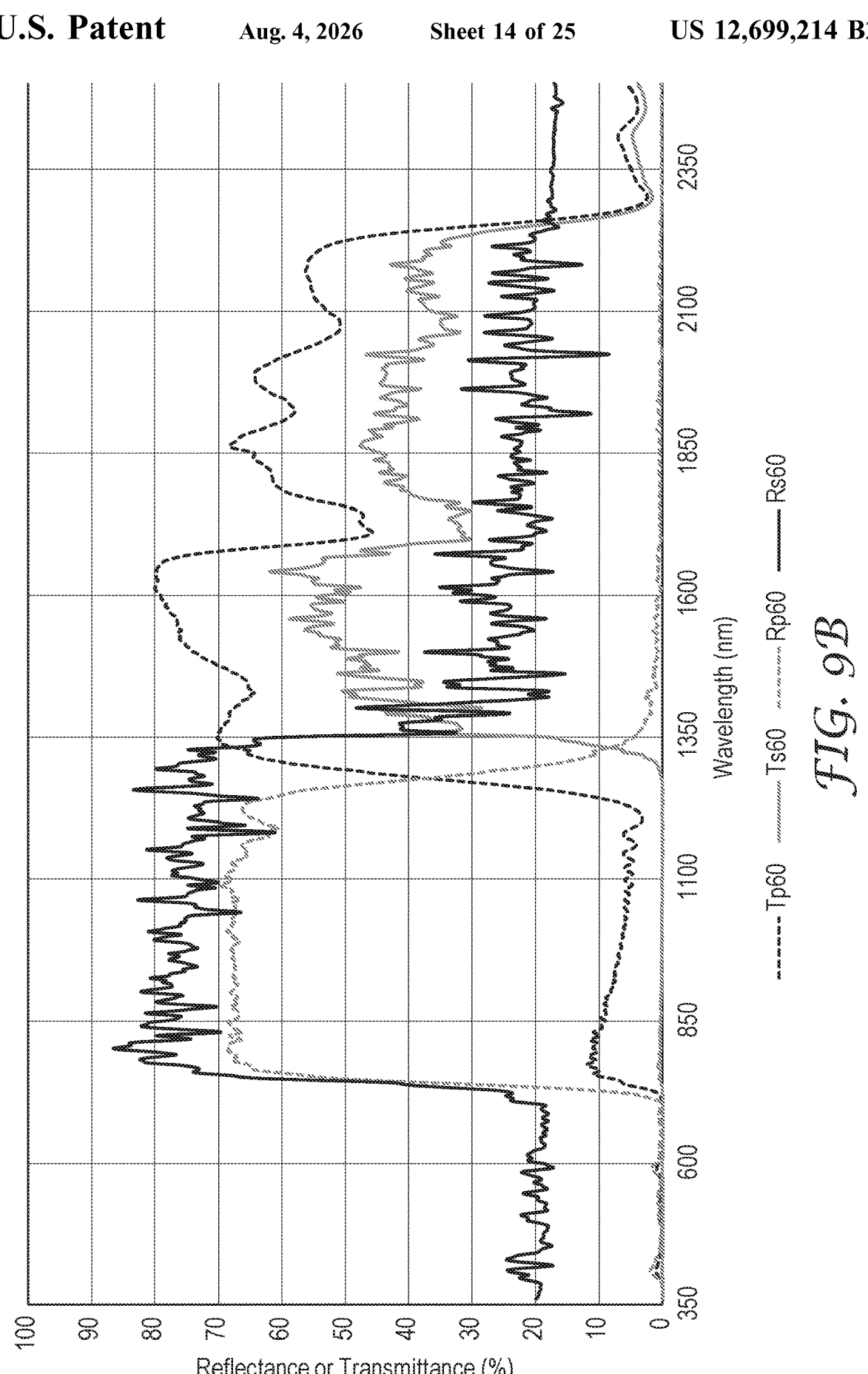

8). The dye or pigment concentration was selected to produce the illustrated extinction coefficients. Other layers incorporating dyes or pigments may be characterized by the concentration of the dyes or pigments relative to the concentration needed to achieve the extinction coefficients of FIG. 8. FIGS. 9A-9B are plots of calculated transmittance and reflectance for a glass laminate including a multilayer optical film disposed between two glass layers (each 2.1 mm thick) and bonded to the glass layers with PVB layers (each 0.38 mm thick). The multilayer optical film included alternating PET and coPMMA optical layers numbering 425 in total and disposed between 25 micrometer thick PET skin layers. The f-ratio of the PET optical layers was 0.625. The PET skin layers were modeled as being loaded with the blue dye, red dye, and yellow pigment of FIG. 8 at respective concentrations of 0.117, 0.067, and 0.05 times the concentration in the respective colored PET layers of FIG. 8. Tp0 and Ts0 are the transmittances at normal incidence for light polarized along a first in-plane direction (e.g., x-direction) and along an orthogonal second in-plane direction (e.g., y-direction), respectively. Similarly. Rp0 and Rs0 are the reflectances at normal incidence for light polarized along the first in-plane direction and along the second in-plane direction, respectively. Tp60 and Ts60 are the transmittances for light incident on the glass laminate at an incident angle of 60 degrees in an incident plane parallel to the first direction for p- and s-polarization states, respectively. Similarly. Rp60 and Rs60 are the reflectances for light incident on the glass laminate at an incident angle of 60 degrees in an incident plane parallel to the first direction for p- and s-polarization states, respectively. The average of Tp0, Ts0, Rp0, and Rs0 over a wavelength range of 450 nm to 650 nm was 0.84%. 0.63%, 5.77%, and 5.82%, respectively. The average of Tp0, Ts0, Rp0, and Rs0 over a wavelength range of 850 nm to 1200 nm was 10.15%, 5.36%, 67.58%, and 72.51%, respectively.

Figure 10A:
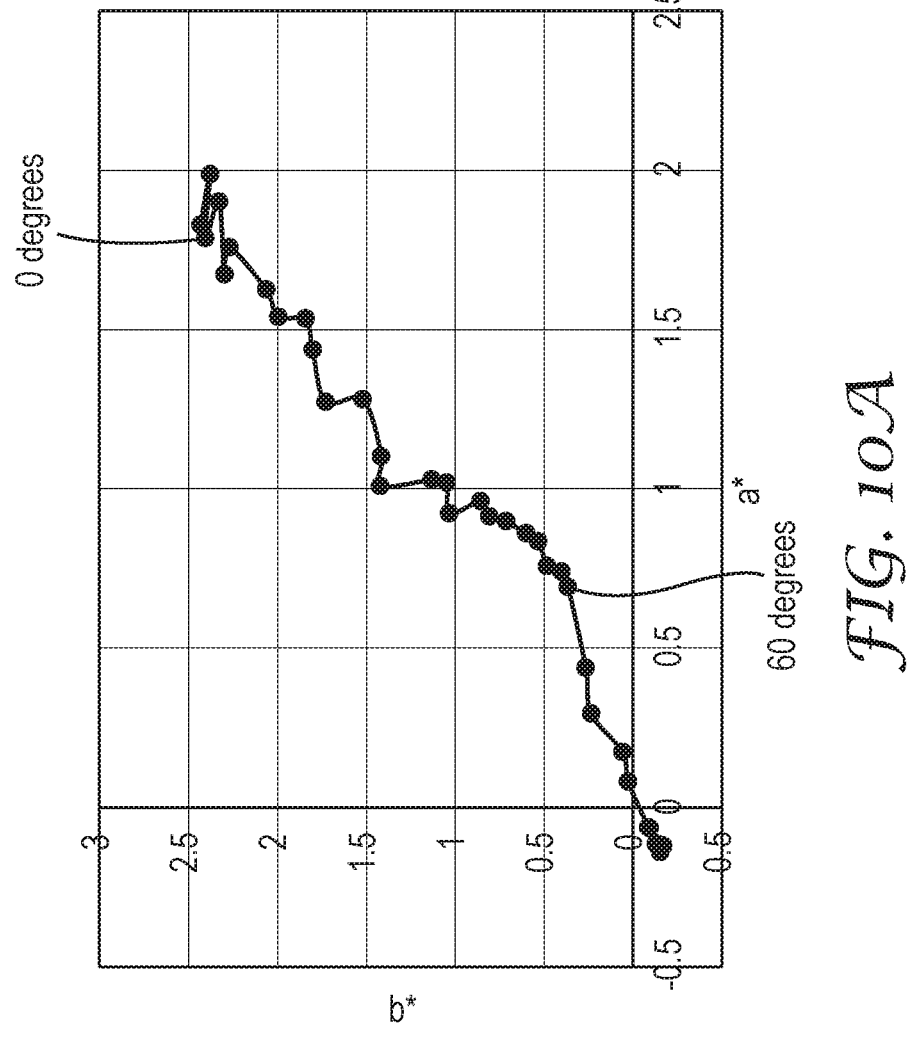
FIGS. 10A-10B are CIE L*a*b* color space plots of calculated a*, b* colorimetric parameters for transmitted and reflected light, respectively, from the glass laminate of FIGS. 9A-9B for light from an illuminant D65 incident on the glass laminate as the incident angle varies, according to some embodiments.
Figure 10B:
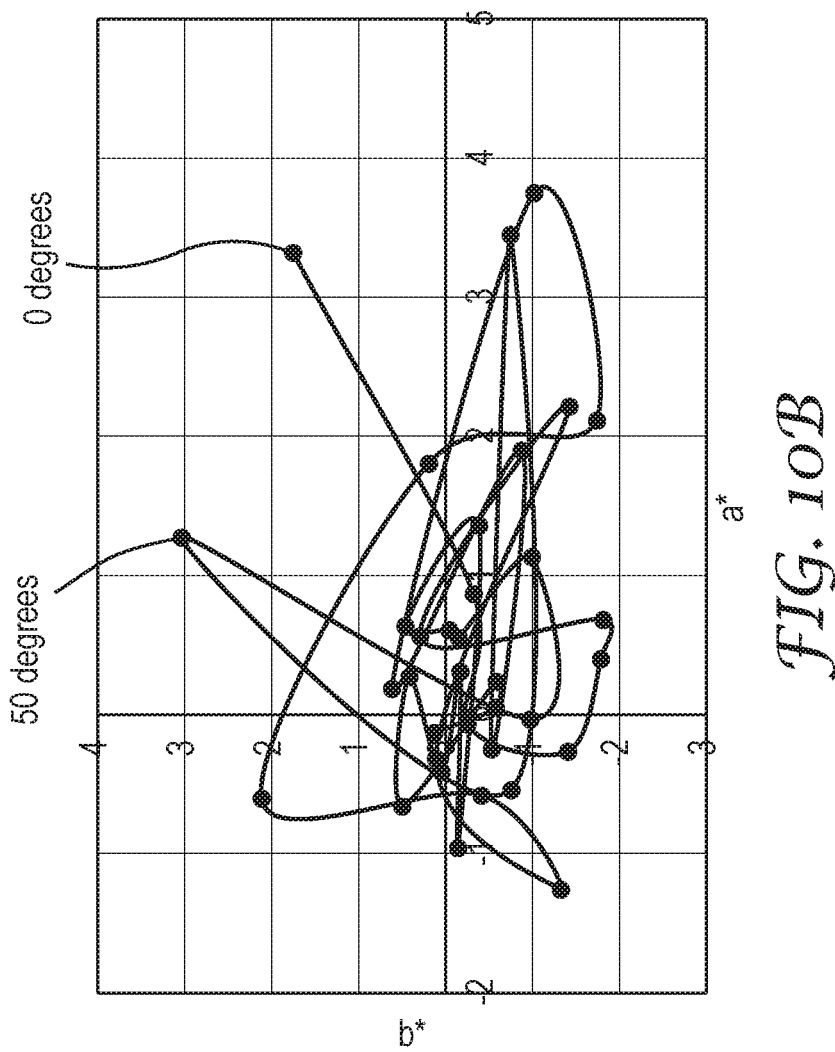

FIGS. 10A-10B are CIE L*a*b* color space plots of calculated a*, b* colorimetric parameters for transmitted and reflected light, respectively, from the glass laminate of FIGS. 9A-9B for light from an illuminant D65 incident on the glass laminate at an incident angle as the incident angle varies from 0 degrees to 85 degrees in 2.5 degree increments.

Figure 11:
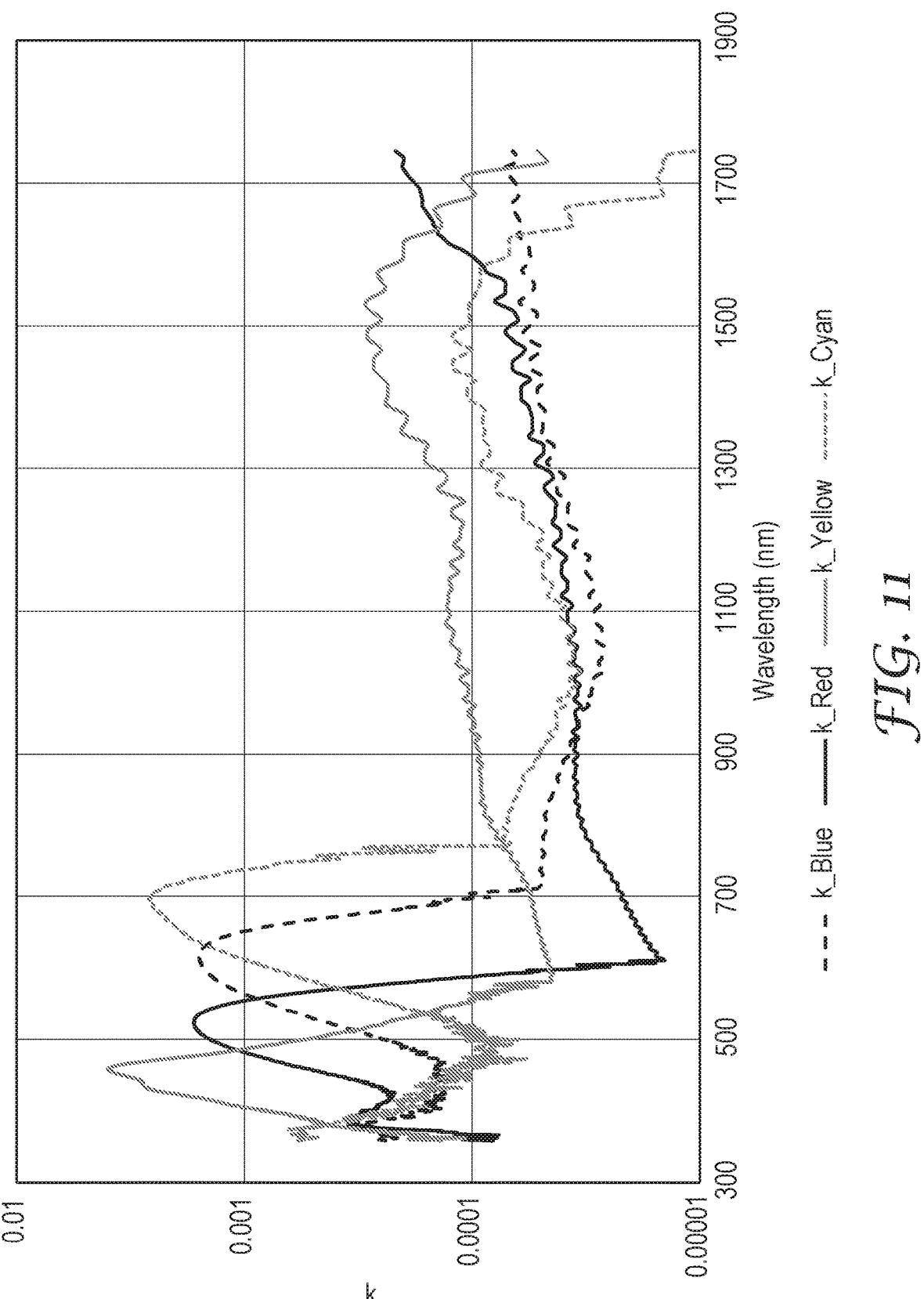
FIG. 11 is a plot of extinction coefficients of polymeric layers containing blue, red, yellow, or cyan dyes, according to some embodiments.
Figure 12A:
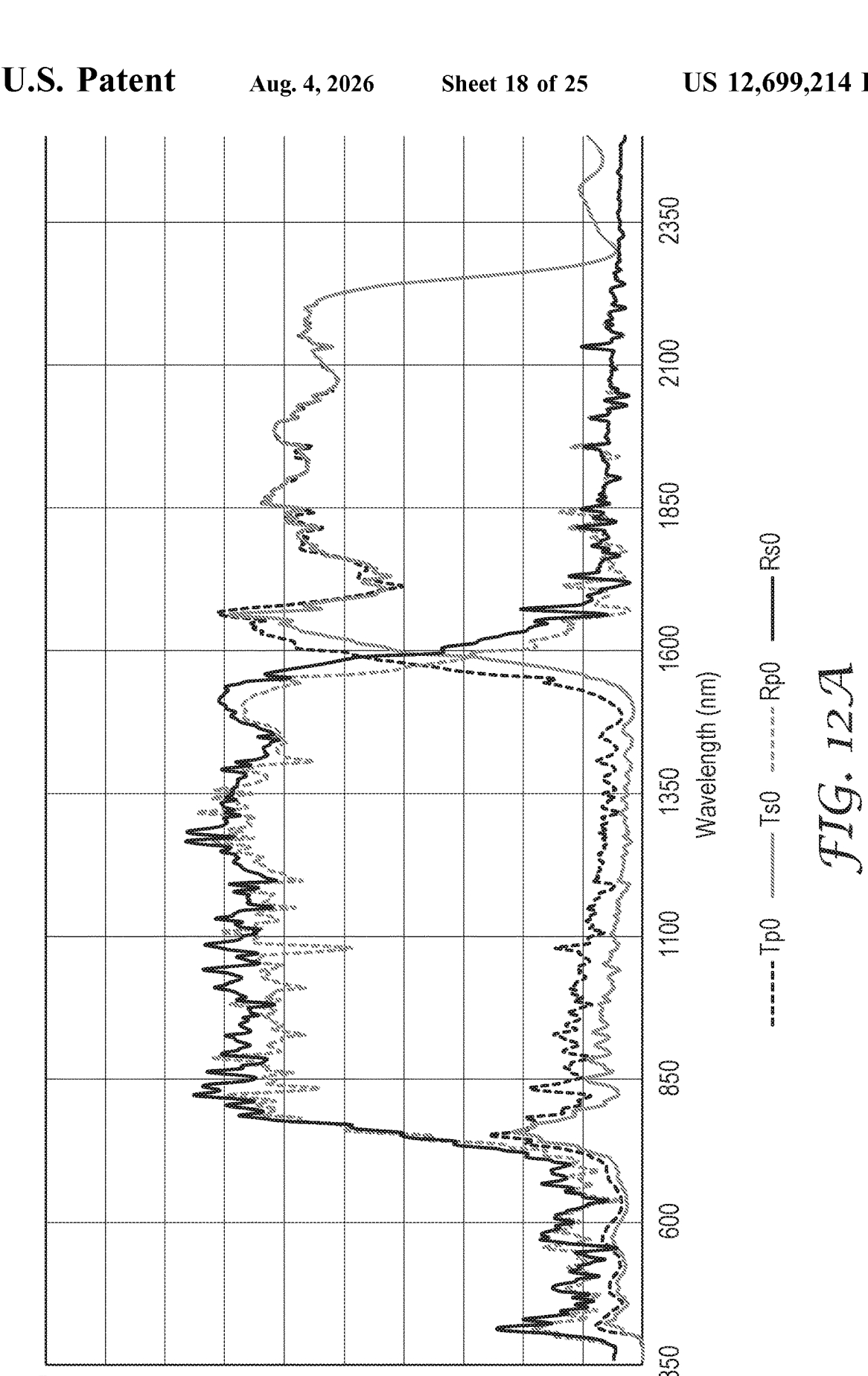
Figure 12B:
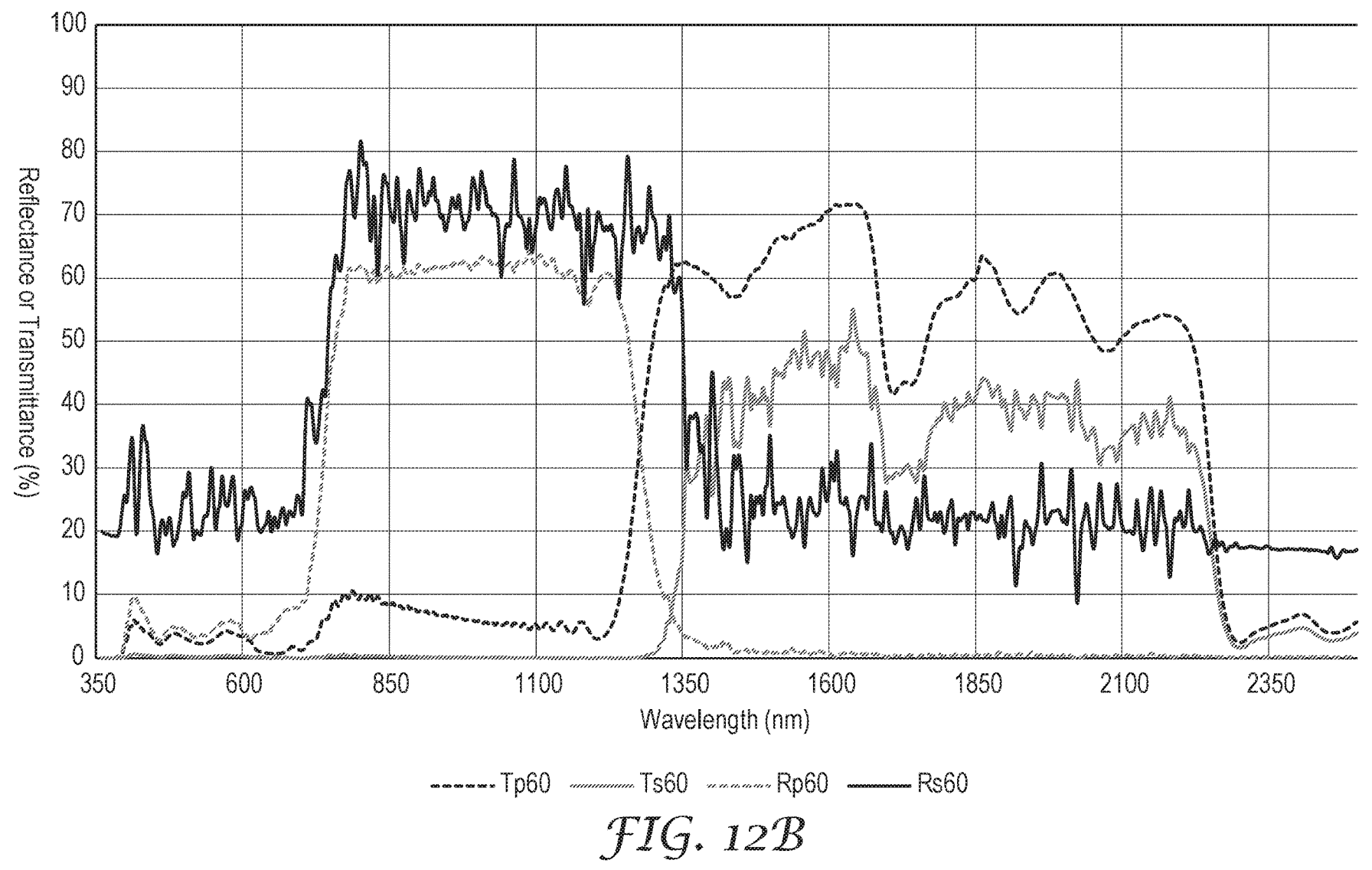

FIG. 11 is a plot of illustrative extinction coefficients of dyed PET layers, where each dyed PET layer includes blue (PD-325H from Mitsui Fine Chemicals), red (PD-104 from Mitsui Fine Chemicals), yellow (PD-335H from Mitsui Fine Chemicals), or cyan (PD-318H from Mitsui Fine Chemicals) dye dispersed in the PET, according to some embodiments. Similar plots can be made for other dyes or pigments and/or for other polymeric layers. The extinction coefficients of FIG. 11 can be the extinction coefficients along each of two orthogonal in-plane directions (e.g., the extinction coefficient of a layer along the x- and y-directions can be approximately the same and can be as shown in FIG. 11). FIGS. 12A-12B are plots of transmittance and reflectance for a glass laminate including a multilayer optical film disposed between two glass layers (each 2.1 mm thick) and bonded to the glass layers with PVB layers (each 0.38 mm thick). The multilayer optical film included alternating PET and coPMMA optical layers numbering 425 in total and disposed between 25 micrometer thick PET skin layers. The f-ratio of the PET optical layers was 0.625. Each of the PET skin layers was modeled as being loaded with the blue, red, yellow, and cyan dyes of FIG. 11 at respective concentrations of 0.9, 0.85, 0.3, and 0.75 times the concentration in the respective dyed PET layers of FIG. 11. Tp0, Ts0. Tp0, and Tp60 are as described elsewhere herein. The average of Tp0, Ts0, Rp0, and Rs0 over a wavelength range of 450 nm to 650 nm was 4.77%, 3.60%, 10.50%, and 11.35%, respectively. The average of Tp0, Ts0, Rp0, and Rs0 over a wavelength range of 850 nm to 1200 nm was 9.42%, 4.97%, 63.14%, and 67.74%, respectively.

Figure 13A:
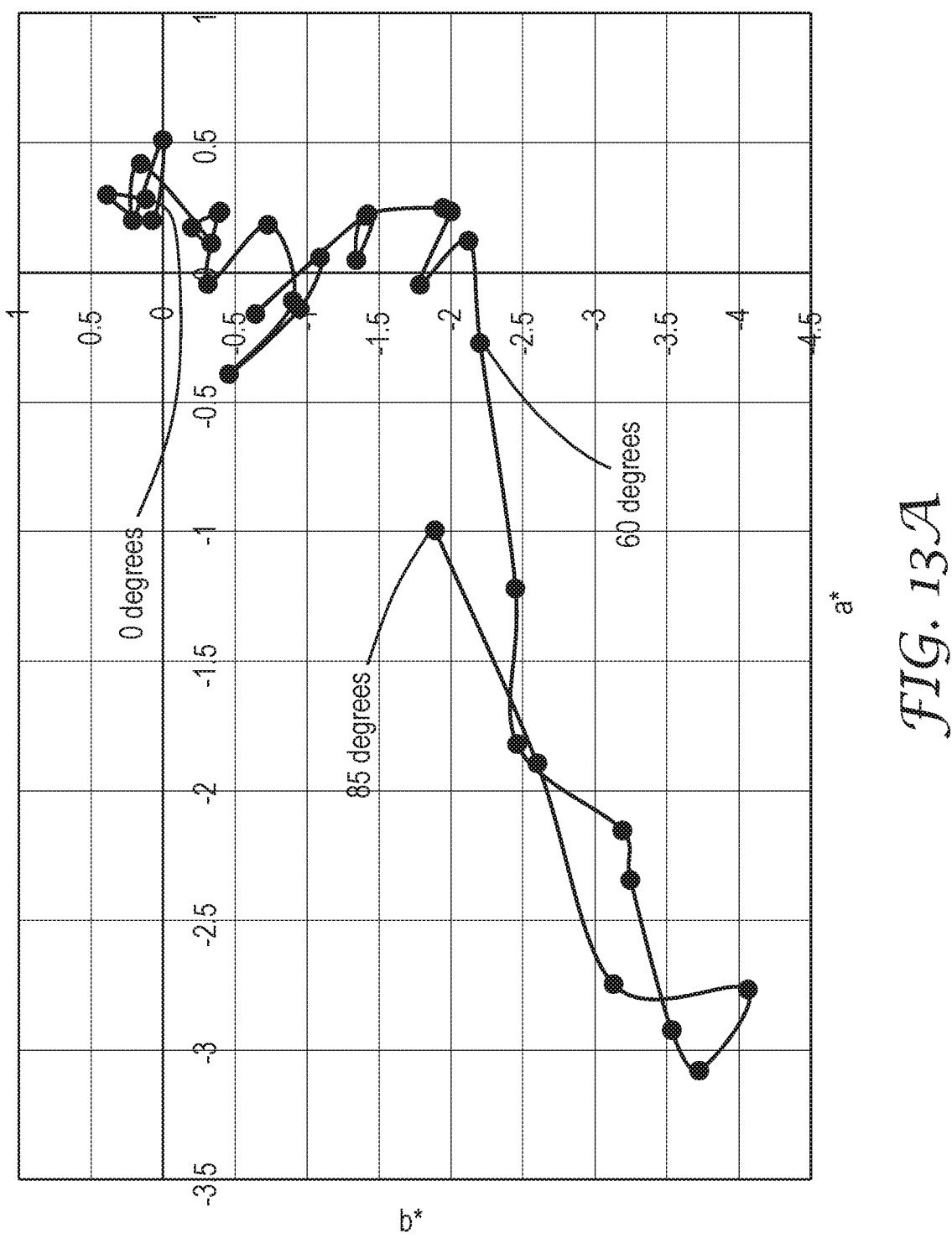
FIGS. 13A-13B are CIE L*a*b* color space plots of calculated a*, b* colorimetric parameters for transmitted and reflected light, respectively, from the glass laminate of FIGS. 12A-12B for light from an illuminant D65 incident on the glass laminate as the incident angle varies, according to some embodiments.
Figure 13B:
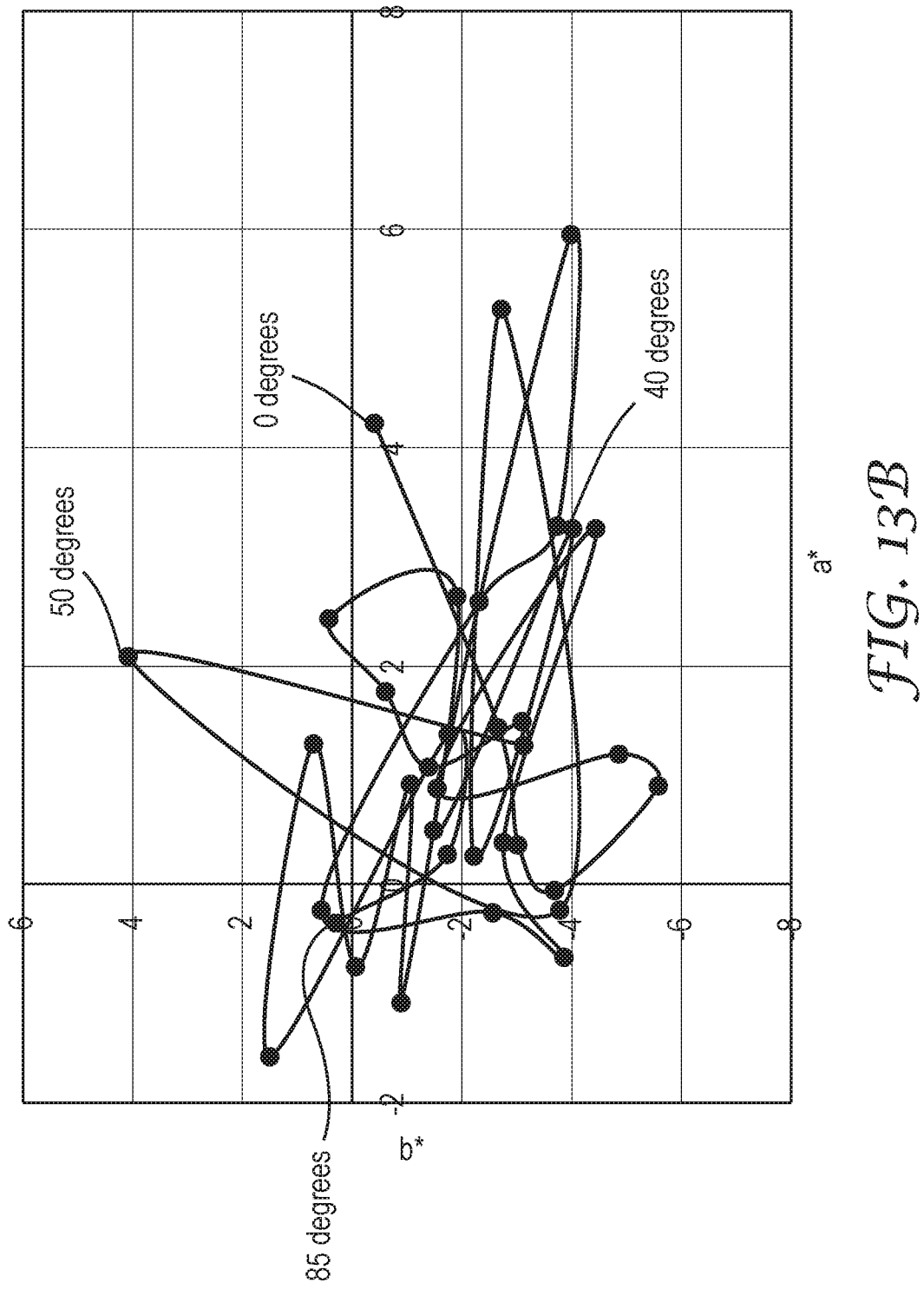

FIGS. 13A-13B are CIE L*a*b* color space plots of calculated a*, b* colorimetric parameters for transmitted and reflected light, respectively, from the glass laminate of FIGS. 12A-12B for light from an illuminant D65 incident on the glass laminate at an incident angle as the incident angle varies from 0 degrees to 85 degrees in 2.5 degree increments.

Figure 14A:
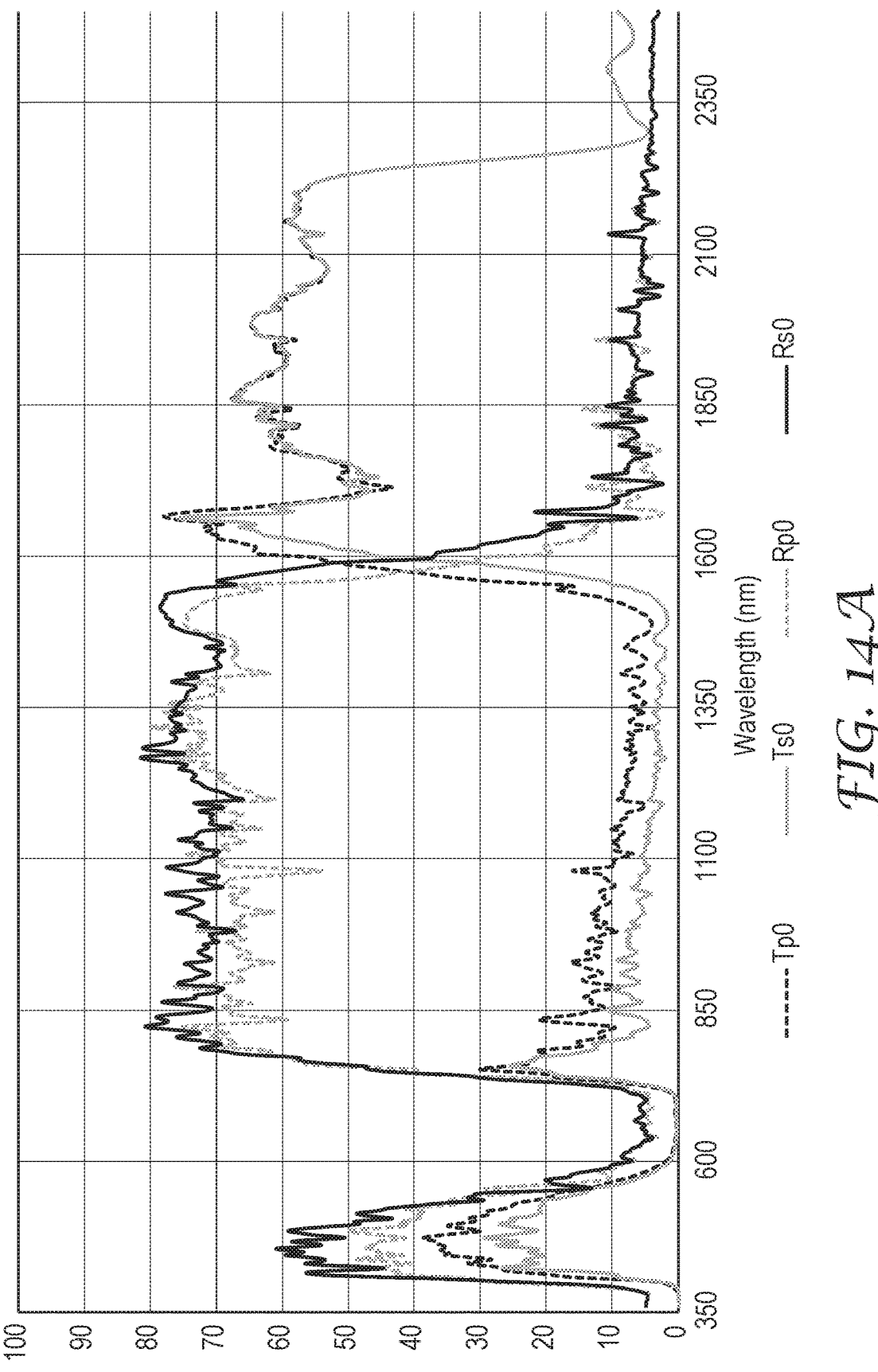
FIGS. 14A-14B are plots of calculated transmittance and reflectance for a glass laminate including a multilayer optical film including skin layers loaded with the blue dye of FIG. 8, according to some embodiments.
Figure 14B:
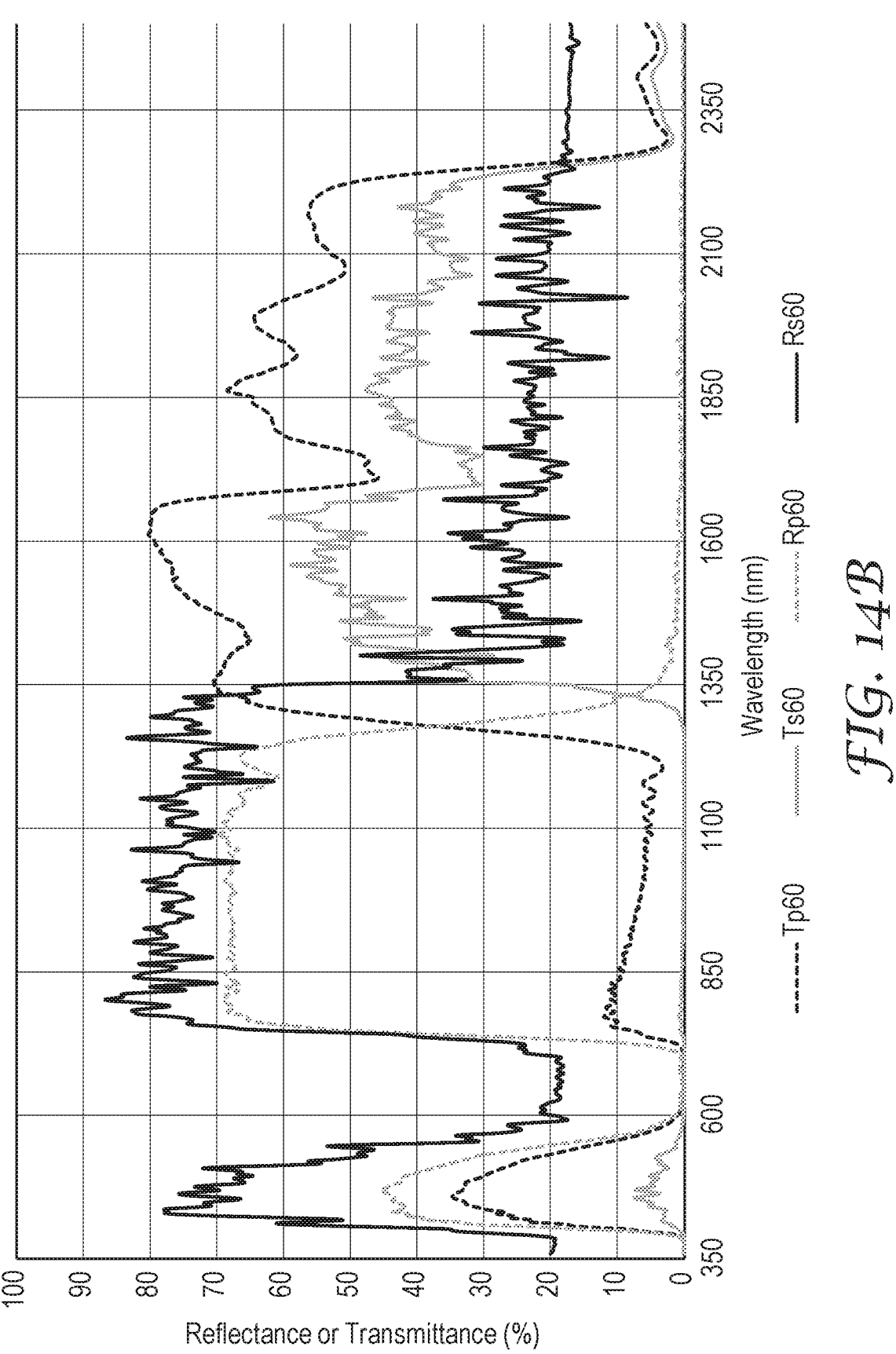

FIGS. 14A-14B are plots of transmittance and reflectance for a multilayer optical film including alternating PET and coPMMA optical layers numbering 425 in total and disposed between 25 micrometer thick PET skin layers. The f-ratio of the PET optical layers was 0.625. The PET skin layers were modeled as being loaded with the blue dyes of FIG. 8 at a concentration of 0.117 times the times the concentration in the blue dyed PET layer of FIG. 8. Tp0, Ts0, Tp0, and Tp60 are as described elsewhere herein. The average of Tp0, Ts0, Rp0, and Rs0 over a wavelength range of +50 nm to 650 nm was 17.21%, 13.05%, 25.35%, and 28.90%, respectively. The average of Tp0, Ts0, Rp0, and Rs0 over a wavelength range of 850 nm to 1200 nm was 10.19%, 5.37%, 67.77%, and 72.71%, respectively.

Figure 15A:
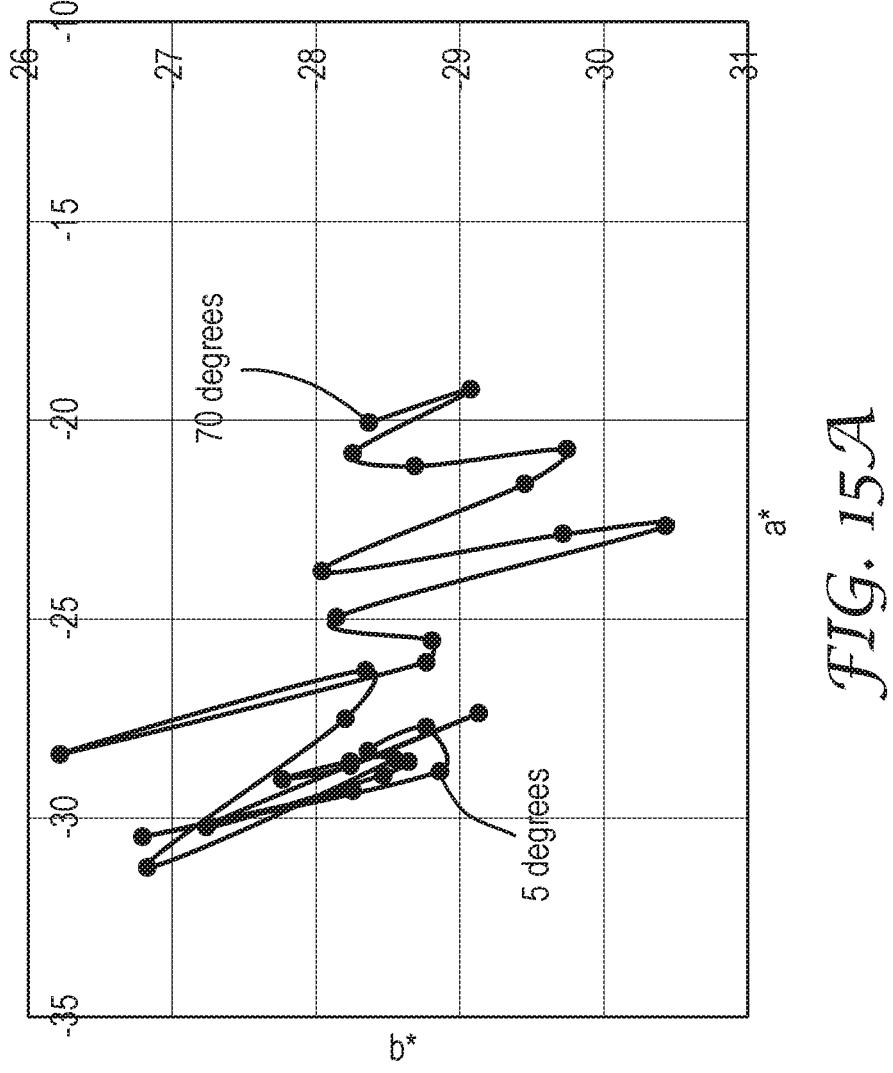
FIGS. 15A-15B are CIE L*a*b* color space plots of calculated a*, b* colorimetric parameters for transmitted and reflected light, respectively, from the glass laminate of FIGS. 14A-14B for light from an illuminant D65 incident on the glass laminate as the incident angle varies, according to some embodiments.
Figure 15B:
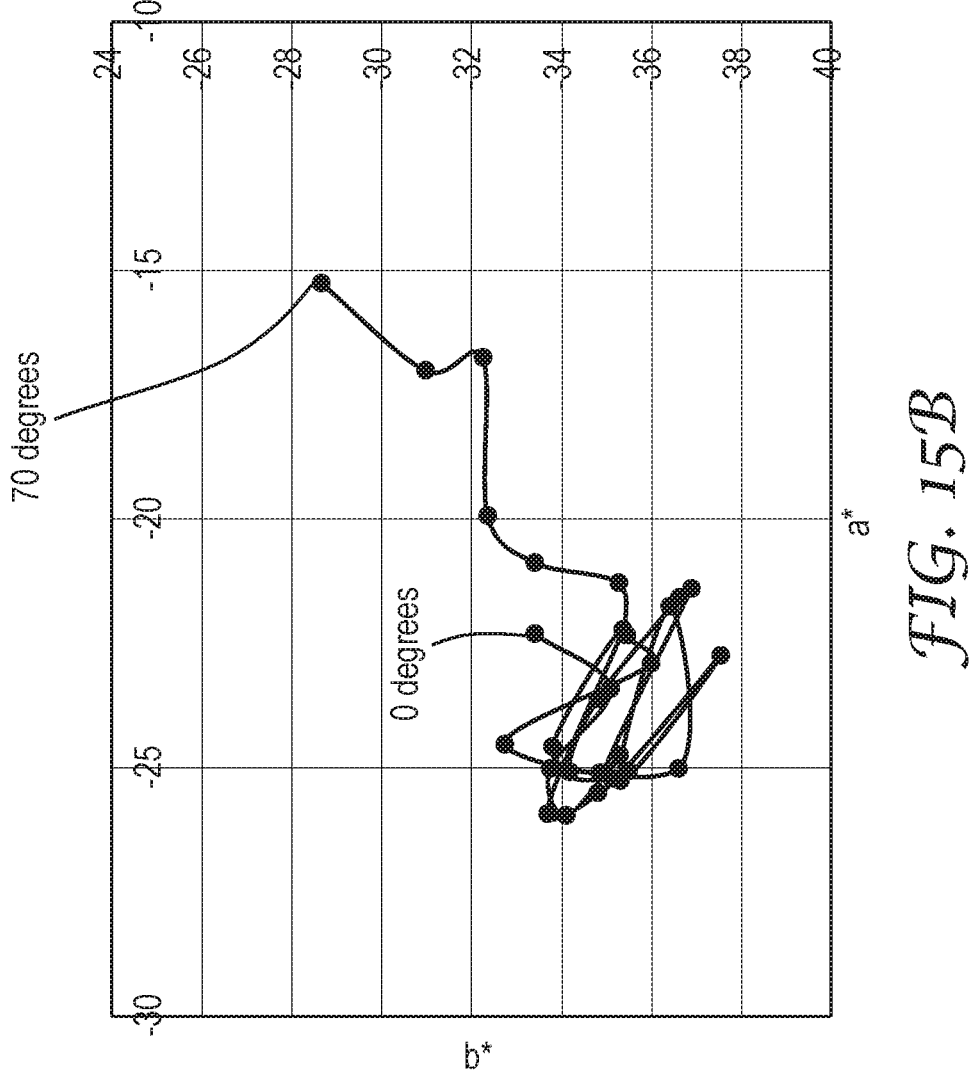

FIGS. 15A-15B are CIE L*a*b* color space plots of the a*, b* colorimetric parameters for transmitted and reflected light, respectively, from the glass laminate of FIGS. 14A-14B for light from an illuminant D65 incident on the glass laminate at an incident angle as the incident angle varies from 0 degrees to 70 degrees in 2.5 degree increments.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. A multilayer optical film comprising:
a plurality of alternating polymeric first and second layers numbering at least 20 in total, each of the first and second layers having an average thickness of less than about 500 nm; and
optically absorptive material dispersed in at least one layer of the multilayer optical film, wherein for a substantially normally incident light and for each of two mutually orthogonal polarization states, the multilayer optical film has an average optical transmittance in a visible wavelength range extending from about 450 nm to about 650 nm of about 0.5% to about 40%, an average optical reflectance in the visible wavelength range of less than about 40%, and an average optical reflectance in an infrared wavelength range extending from about 850 nm to about 1200 nm of greater than about 60%, and wherein for a light incident on the multilayer optical film from an illuminant D65, the multilayer optical film reflects and transmits portions of the incident light as reflected and transmitted lights having, in a CIE L*a*b* color space, respective "a*" colorimetric parameters ar1* and at1* for an incident angle of less than about 10 degrees and respective "a*" colorimetric parameters ar2* and at2* for an incident angle of about 40 degrees, a magnitude of a difference between each of at1* and at2*, and ar1* and ar2* being less than about 20.

2. The multilayer optical film of claim 1, wherein the reflected and transmitted lights have, in the CIE L*a*b* color space, respective "b*" colorimetric parameters br1* and bt1* for an incident angle of less than about 10 degrees and respective "b*" colorimetric parameters br2* and bt2* for an incident angle of about 40 degrees, a magnitude of a difference between each of br1* and br2*, and bt1* and bt2* being less than about 35.

3. The multilayer optical film of claim 1, wherein the first and second layers have respective indices of refraction n1 and n2 and corresponding respective f-ratios f1 and f2 along a same in-plane first direction for a same first visible wavelength in the visible wavelength range, and wherein n1>n2 and one of f1 and f2 is between about 0.55 and about 0.80.

4. The multilayer optical film of claim 3, wherein one of f1 and f2 is between about 0.6 and about 0.75.

5. The multilayer optical film of claim 1, wherein the first and second layers have respective indices of refraction n1 and n2 and corresponding respective f-ratios f1 and f2 along a same in-plane first direction for a same first visible wavelength in the visible wavelength range, and wherein each of f1 and f2 is about 0.5.

6. The multilayer optical film of claim 1 further comprising first and second skin layers integrally formed with the plurality of alternating polymeric first and second layers, each of the first and second skin layers having an average thickness of greater than about 1 micrometer, the plurality of alternating polymeric first and second layers disposed between the first and second skin layers, wherein the optically absorptive material comprises a first optically absorptive material dispersed in at least one of the first and second skin layers, and a second optically absorptive material dispersed in each of the polymeric first layers or in each of the polymeric second layers, the first and second optically absorptive materials having different compositions.

7. The multilayer optical film of claim 6 further comprising first and second adhesive layers, the first and second skin layers and the plurality of alternating polymeric first and second layers disposed between the first and second adhesive layers, wherein the optically absorptive material further comprises a third optically absorptive material dispersed in at least one of the first and second adhesive layers, the third optically absorptive material having a composition different from that of each of the first and second optically absorptive materials.

8. A glass laminate comprising first and second glass layers and the multilayer optical film of claim 1 disposed therebetween.

9. A multilayer optical film comprising:

a plurality of alternating polymeric first and second layers numbering at least 20 in total, each of the first and second layers having an average thickness of less than about 500 nm; and optically absorptive material dispersed in at least one layer of the multilayer optical film, wherein for a substantially normally incident light and for each of two mutually orthogonal polarization states, the multilayer optical film has an average optical transmittance in a visible wavelength range extending from about 450 nm to about 650 nm of about 0.5% to about 40%, an average optical reflectance in the visible wavelength range of less than about 40%, and an average optical reflectance in an infrared wavelength range extending from about 850 nm to about 1200 nm of greater than about 60%, and wherein for a light incident on the multilayer optical film from an illuminant D65, the multilayer optical film reflects and transmits portions of the incident light as reflected and transmitted lights having, in a CIE L*a*b* color space, respective "b*" colorimetric parameters br1* and bt1* for an incident angle of less than about 10 degrees and respective "b*" colorimetric parameters br2* and bt2* for an incident angle of about 60 degrees, a magnitude of a difference between each of br1* and br2*, and bt1* and bt2* being less than about 35.

10. The multilayer optical film of claim 9, wherein the reflected and transmitted lights have, in the CIE L*a*b* color space, respective "a*" colorimetric parameters ar1* and at1* for an incident angle of less than about 10 degrees and respective "a*" colorimetric parameters ar2* and at2* for an incident angle of about 60 degrees, a magnitude of a difference between each of at1* and at2*, and ar1* and ar2* being less than about 35.

11. The multilayer optical film of claim 9 further comprising first and second skin layers integrally formed with the plurality of alternating polymeric first and second layers, each of the first and second skin layers having an average thickness of greater than about 1 micrometer, the plurality of alternating polymeric first and second layers disposed between the first and second skin layers, wherein the optically absorptive material comprises a first optically absorptive material dispersed in at least one of the first and second skin layers, and a second optically absorptive material dispersed in each of the polymeric first layers or in each of the polymeric second layers, the first and second optically absorptive materials having different compositions.

12. The multilayer optical film of claim 11 further comprising first and second adhesive layers, the first and second skin layers and the plurality of alternating polymeric first and second layers disposed between the first and second adhesive layers, wherein the optically absorptive material further comprises a third optically absorptive material dispersed in at least one of the first and second adhesive layers, the third optically absorptive material having a composition different from that of each of the first and second optically absorptive materials.

13. A multilayer optical film comprising:

a plurality of alternating polymeric first and second layers numbering at least 20 in total, each of the first and second layers having an average thickness of less than about 500 nm; and optically absorptive material dispersed in at least one layer of the multilayer optical film, wherein for a substantially normally incident light and for each of two mutually orthogonal polarization states, the multilayer optical film has an average optical transmittance in a visible wavelength range extending from about 450 nm to about 650 nm of about 0.5% to about 40%, an average optical reflectance in the visible wavelength range of less than about 40%, and an average optical reflectance in an infrared wavelength range extending from about 850 nm to about 1200 nm of greater than about 60%, and wherein for a light incident on the multilayer optical film from an illuminant D65 at an incident angle, the multilayer optical film transmits a portion of the incident light as a transmitted light having, in a CIE L*a*b* color space, an "a*" colorimetric parameter at* and a "b*" colorimetric parameter bt*, a magnitude of each of at* and bt* remaining less than about 35 as the incident angle varies continuously from less than about 10 degrees to at least about 40 degrees.

14. The multilayer optical film of claim 13, wherein for the light incident on the multilayer optical film from the illuminant D65, the multilayer optical film reflects a portion of the incident light as a reflected light having, in CIE L*a*b* color space, an "a*" colorimetric parameter ar* and a "b*" colorimetric parameter br*, a magnitude of each of ar* and br* remaining less than about 45 as the incident angle varies continuously from less than about 10 degrees to at least about 40 degrees.

15. The multilayer optical film of claim 14, wherein the magnitude of each of at*, bt*, ar*, and br* remains less than about 25 as the incident angle varies continuously from less than about 10 degrees to at least about 40 degrees.

16. The multilayer optical film of claim 13 further comprising first and second skin layers integrally formed with the plurality of alternating polymeric first and second layers, each of the first and second skin layers having an average thickness of greater than about 1 micrometer, the plurality of alternating polymeric first and second layers disposed between the first and second skin layers, wherein the optically absorptive material comprises a first optically absorptive material dispersed in at least one of the first and second skin layers, and a second optically absorptive material dispersed in each of the polymeric first layers or in each of the polymeric second layers, the first and second optically absorptive materials having different compositions.

17. The multilayer optical film of claim 16 further comprising first and second adhesive layers, the first and second skin layers and the plurality of alternating polymeric first and second layers disposed between the first and second adhesive layers, wherein the optically absorptive material further comprises a third optically absorptive material dispersed in at least one of the first and second adhesive layers, the third optically absorptive material having a composition different from that of each of the first and second optically absorptive materials.

18. A multilayer optical film comprising:

a plurality of alternating polymeric first and second layers numbering at least 20 in total, each of the first and second layers having an average thickness of less than about 500 nm; and optically absorptive material dispersed in at least one layer of the multilayer optical film, wherein for a substantially normally incident light and for each of two mutually orthogonal polarization states, the multilayer optical film has an average optical transmittance in a visible wavelength range extending from about 450 nm to about 650 nm of about 0.5% to about 40%, an average optical reflectance in the visible wavelength range of less than about 40%, and an average optical reflectance in an infrared wavelength range extending from about 850 nm to about 1200 nm of greater than about 60%, and wherein for a light incident on the multilayer optical film from an illuminant D65 at an incident angle, the multilayer optical film reflects a portion of the incident light as a reflected light having, in CIE L*a*b* color space, an "a*" colorimetric parameter ar* and a "b*" colorimetric parameter br*, a magnitude of each of ar* and br* remaining less than about 45 as the incident angle varies continuously from less than about 10 degrees to at least about 40 degrees.

19. The multilayer optical film of claim 18, wherein a magnitude of each of ar* and br* remains less than about 25 as the incident angle varies continuously from less than about 10 degrees to at least about 40 degrees.

20. The multilayer optical film of claim 18 further comprising first and second skin layers integrally formed with the plurality of alternating polymeric first and second layers, each of the first and second skin layers having an average thickness of greater than about 1 micrometer, the plurality of alternating polymeric first and second layers disposed between the first and second skin layers, wherein the optically absorptive material comprises a first optically absorptive material dispersed in at least one of the first and second skin layers, and a second optically absorptive material dispersed in each of the polymeric first layers or in each of the polymeric second layers, the first and second optically absorptive materials having different compositions.

\*    \*    \*    \*    \*